(12) United States Patent
Yagi et al.

(10) Patent No.: US 11,313,797 B2
(45) Date of Patent: *Apr. 26, 2022

(54) OPTICAL WAVEGUIDE AND OPTICAL CONCENTRATION MEASURING APPARATUS

(71) Applicant: Asahi Kasei Microdevices Corporation, Tokyo (JP)

(72) Inventors: Tatsushi Yagi, Tokyo (JP); Takaaki Furuya, Tokyo (JP); Toshiro Sakamoto, Tokyo (JP)

(73) Assignee: Asahi Kasei Microdevices Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/144,139

(22) Filed: Jan. 8, 2021

(65) Prior Publication Data

US 2021/0131963 A1 May 6, 2021

Related U.S. Application Data

(63) Continuation of application No. 16/556,539, filed on Aug. 30, 2019, now Pat. No. 10,928,318.

(30) Foreign Application Priority Data

Aug. 31, 2018 (JP) .................................. 2018-163489
Aug. 31, 2018 (JP) .................................. 2018-163649
(Continued)

(51) Int. Cl.
*G01N 21/552* (2014.01)
*G02B 6/42* (2006.01)
*G01N 21/3504* (2014.01)

(52) U.S. Cl.
CPC ....... *G01N 21/552* (2013.01); *G01N 21/3504* (2013.01); *G02B 6/42* (2013.01); *G02B 6/4206* (2013.01); *G02B 6/4215* (2013.01)

(58) Field of Classification Search
CPC .... G01N 21/552; G01N 21/3504; G02B 6/42; G02B 6/4206; G02B 6/4215; G02B 6/00; H02S 40/22
See application file for complete search history.

(56) References Cited

U.S. PATENT DOCUMENTS

| | | | |
|---|---|---|---|
| 7,528,403 B1 | 5/2009 | Borselli et al. | |
| 10,928,318 B2 * | 2/2021 | Yagi | G02B 6/4215 |

(Continued)

FOREIGN PATENT DOCUMENTS

| | | |
|---|---|---|
| EP | 0424703 A2 | 5/1991 |
| EP | 1918693 A1 | 5/2008 |

(Continued)

OTHER PUBLICATIONS

T Begou. et al., Marcatili's extended approach: comparison to semi-vectorial methods applied to pedestal waveguide design, Journal of Optics A: Pure and Applied Optics, May 2008, pp. 1-9, vol. 10, No. 5.

(Continued)

*Primary Examiner* — Leslie C Pascal
(74) *Attorney, Agent, or Firm* — Kenja IP Law PC

(57) ABSTRACT

Sticking of core layer is suppressed, and deterioration of sensitivity of a sensor is prevented. An optical waveguide (10) includes a substrate (15), a core layer (11), a support, and a protrusion (18). The core layer (11) can transmit light. The support connects at least a portion of the substrate (15) and a portion of the core layer (11) together. The support supports the core layer (11). The protrusion (18) is arranged at a position different from a position of the support in a (Continued)

space between the substrate (15) and the core layer (11). The protrusion (18) has a maximum height at a position deviated from a central position cp of the core layer (11) in a width direction. The protrusion (18) protrudes toward the core layer (11) from the substrate (15).

16 Claims, 34 Drawing Sheets

(30) Foreign Application Priority Data

May 23, 2019 (JP) .................................. 2019-096823
Jun. 7, 2019 (JP) .................................. 2019-107436

(56) References Cited

U.S. PATENT DOCUMENTS

| 11,036,013 | B2 | 6/2021 | Takahashi et al. |
| 2003/0109055 | A1 | 6/2003 | Lehmann et al. |
| 2005/0089261 | A1 | 4/2005 | Shimazaki |
| 2010/0307246 | A1 | 12/2010 | Fujii et al. |
| 2010/0307617 | A1 | 12/2010 | Miura et al. |
| 2011/0112769 | A1 | 5/2011 | Niederberger et al. |
| 2011/0268385 | A1 | 11/2011 | Yamashita et al. |
| 2014/0264030 | A1 | 9/2014 | Lin et al. |
| 2016/0284502 | A1 | 9/2016 | Paoloni |
| 2018/0070868 | A1 | 3/2018 | Lin |
| 2018/0164208 | A1 | 6/2018 | Gylfason et al. |
| 2020/0158635 | A1 | 5/2020 | Sakamoto et al. |

FOREIGN PATENT DOCUMENTS

| JP | H03122553 | A | 5/1991 |
| JP | 2005077315 | A | 3/2005 |
| JP | 2005134139 | A | 5/2005 |
| JP | 2005300212 | A | 10/2005 |
| JP | 2008116955 | A | 5/2008 |
| JP | 2010014739 | A | 1/2010 |
| JP | 2011017693 | A | 1/2011 |
| JP | 2011521278 | A | 7/2011 |
| JP | 2011232574 | A | 11/2011 |
| JP | 2012135819 | A | 7/2012 |
| JP | 2016185574 | A | 10/2016 |
| JP | 2018521322 | A | 8/2018 |
| WO | 2008111745 | A1 | 9/2008 |
| WO | 2009096529 | A1 | 8/2009 |
| WO | 2016086090 | A1 | 6/2016 |
| WO | 2017003353 | A1 | 1/2017 |
| WO | 2019177517 | A1 | 9/2019 |

OTHER PUBLICATIONS

Pao Tai Lin et al., Si-CMOS compatible materials and devices for mid-IR microphotonics, Optical Materials Express, Sep. 1, 2013, pp. 1474-1487, vol. 3, No. 9.

Sep. 10, 2019, International Preliminary Report on Patentability issued in the International Patent Application No. PCT/JP2018/005776.

\* cited by examiner

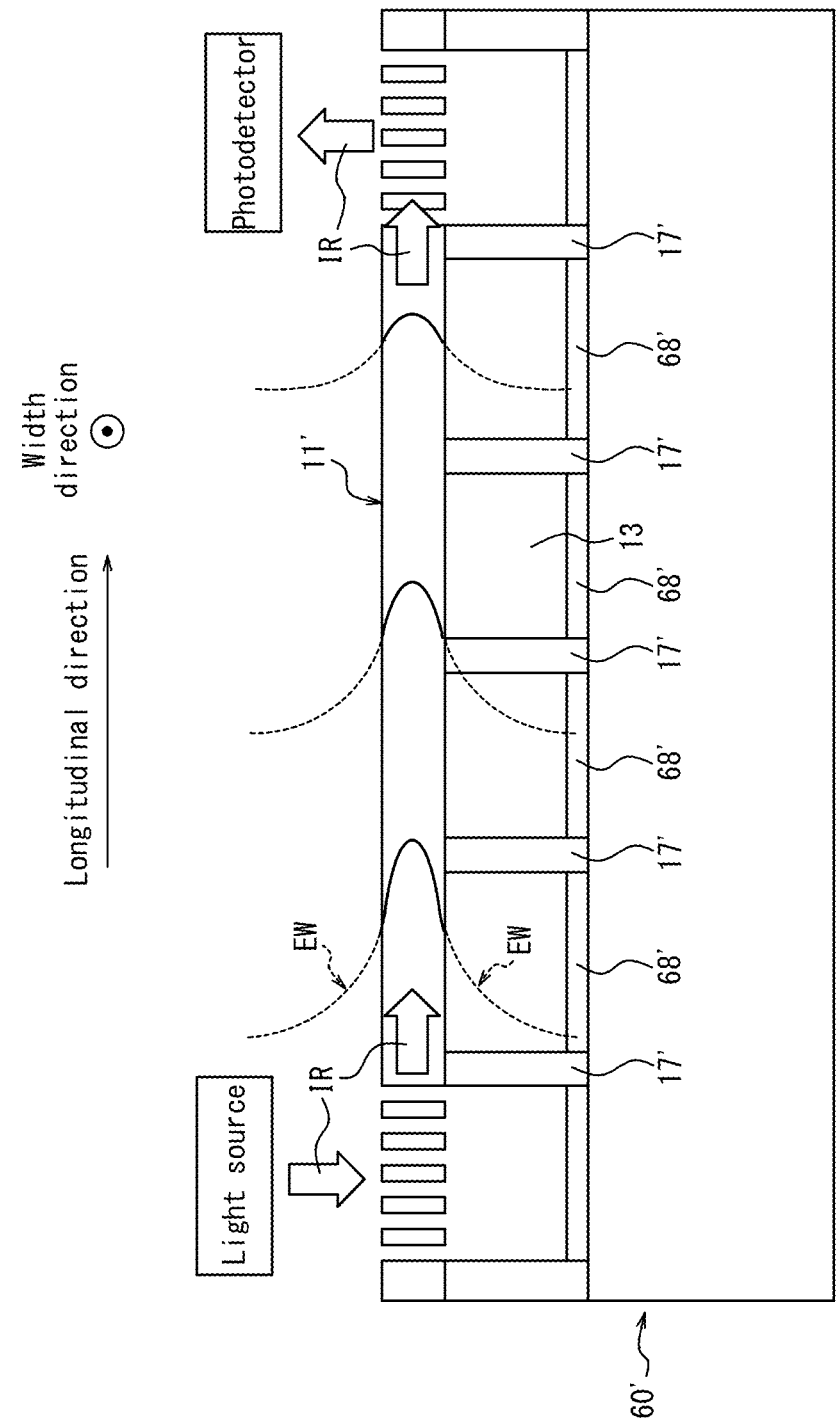

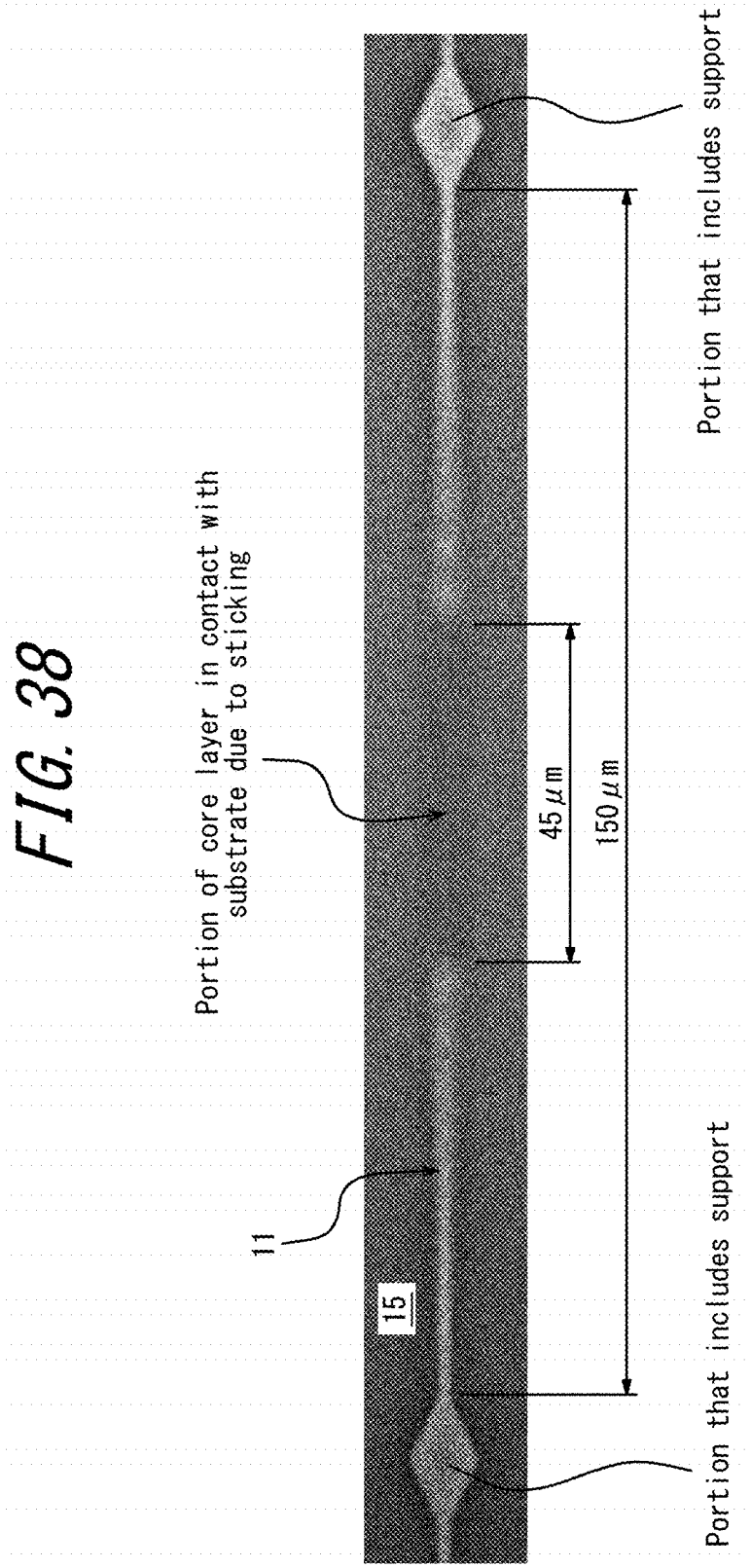

OPTICAL WAVEGUIDE AND OPTICAL CONCENTRATION MEASURING APPARATUS

CROSS-REFERENCE TO RELATED APPLICATIONS

The present application is a continuation application of U.S. patent application Ser. No. 16/556,539, filed Aug. 30, 2019, which claims priority to Japanese Patent Applications No. 2018-163489 and No. 2018-163649 filed on Aug. 31, 2018, Japanese Patent Application No. 2019-096823 filed on May 23, 2019, and Japanese Patent Application No. 2019-107436 filed on Jun. 7, 2019, each of which is incorporated by reference herein in its entirety

TECHNICAL FIELD

The present disclosure relates to an optical waveguide and an optical concentration measuring apparatus.

BACKGROUND

When a refractive index of a material of a structure, such as a thin film formed from crystals or the like, is greater than a refractive index of a material external to the structure, light transmitted through the structure travels repeatedly undergoing total internal reflection at the boundary between the structure and the outside of the structure.

As illustrated in FIG. 17, when light L transmitted through a structure 51 is entirely reflected on the boundary between the structure 51 and a substance 53, the light L travels through the structure 51 and partially extends to the substance 53 that has a small refractive index. Such an extension is referred to as an evanescent wave, which can be absorbed by a substance adjacent to the structure 51 when the light L is transmitted through the structure 51. In FIG. 17, a light intensity E1 represents an intensity of the light L transmitted in the structure 51, and a light intensity E2 represents an intensity of an evanescent wave. This enables detection and identification of the substance 53 in contact with the structure 51 based on a change in the intensity of the light L transmitted through the structure 51. An analyzing method using the principle of the evanescent wave described above is referred to as an ATR (Attenuated Total Reflection) method and used in chemical composition analysis of substances and the like.

Patent literature (PTL) 1 set forth below proposes an optical waveguide sensor in which the ATR method is applied to a sensor. This optical waveguide sensor is configured to irradiate light into a core layer formed on a substrate and detect a substance in contact with the core layer by using the evanescent wave.

Typically, infrared radiation is used as the light to be transmitted through the core layer. Because substances have the property of selectively absorbing infrared radiation of particular wavelengths, a substance to be measured can be analyzed and sensed by transmitting infrared radiation in accordance with an absorption spectrum of the substance to be measured.

In order to improve sensitivity of a sensor, it is necessary to reduce an optical loss of the core layer and increase a region of interaction between the substance to be measured and the evanescent wave. As such, for example, a structure in which a portion of a waveguide is floated with respect to the substrate by using intermittently arranged support structures is proposed.

CITATION LIST

Patent Literature

PTL 1: JP2005-300212A

SUMMARY

However, the structure in which a portion of the waveguide is floated with respect to the substrate deteriorates a mechanical strength of a sensor and has low reliability. Thus, it is difficult to achieve high sensitivity and high reliability of the sensor.

It could be helpful to provide an optical waveguide and an optical concentration measuring apparatus which realize high sensitivity and high reliability.

One of the disclosed aspects therefore provides an optical waveguide used in an optical concentration measuring apparatus for measuring concentration of a target gas or a target liquid to be measured, the optical waveguide including a substrate, a core layer that can transmit light and extends along a longitudinal direction, a support that connects at least a portion of the substrate and a portion of the core layer and supports the core layer with respect to the substrate, and protrusions that are intermittently arranged in the longitudinal direction in a space between the substrate and the core layer and protrude toward the core layer from the substrate.

One of the disclosed aspects therefore provides an optical concentration measuring apparatus that includes the optical waveguide according to any one of the embodiments of the present disclosure, a light source capable of irradiating light into the core layer, and a detector capable of receiving light transmitted through the core layer.

The present disclosure can provide an optical waveguide and an optical concentration measuring apparatus that realize high sensitivity and high reliability of a sensor.

BRIEF DESCRIPTION OF THE DRAWINGS

In the accompanying drawings:

FIG. 37 is a diagram illustrating an optical waveguide that includes intermittent supports and protrusions arranged over the entire area between the intermittent supports; and FIG. 38 is a diagram illustrating an experimental result for calculating an area that does not include a support and a protrusion in a longitudinal direction of the core layer.

DETAILED DESCRIPTION

Figure 1:
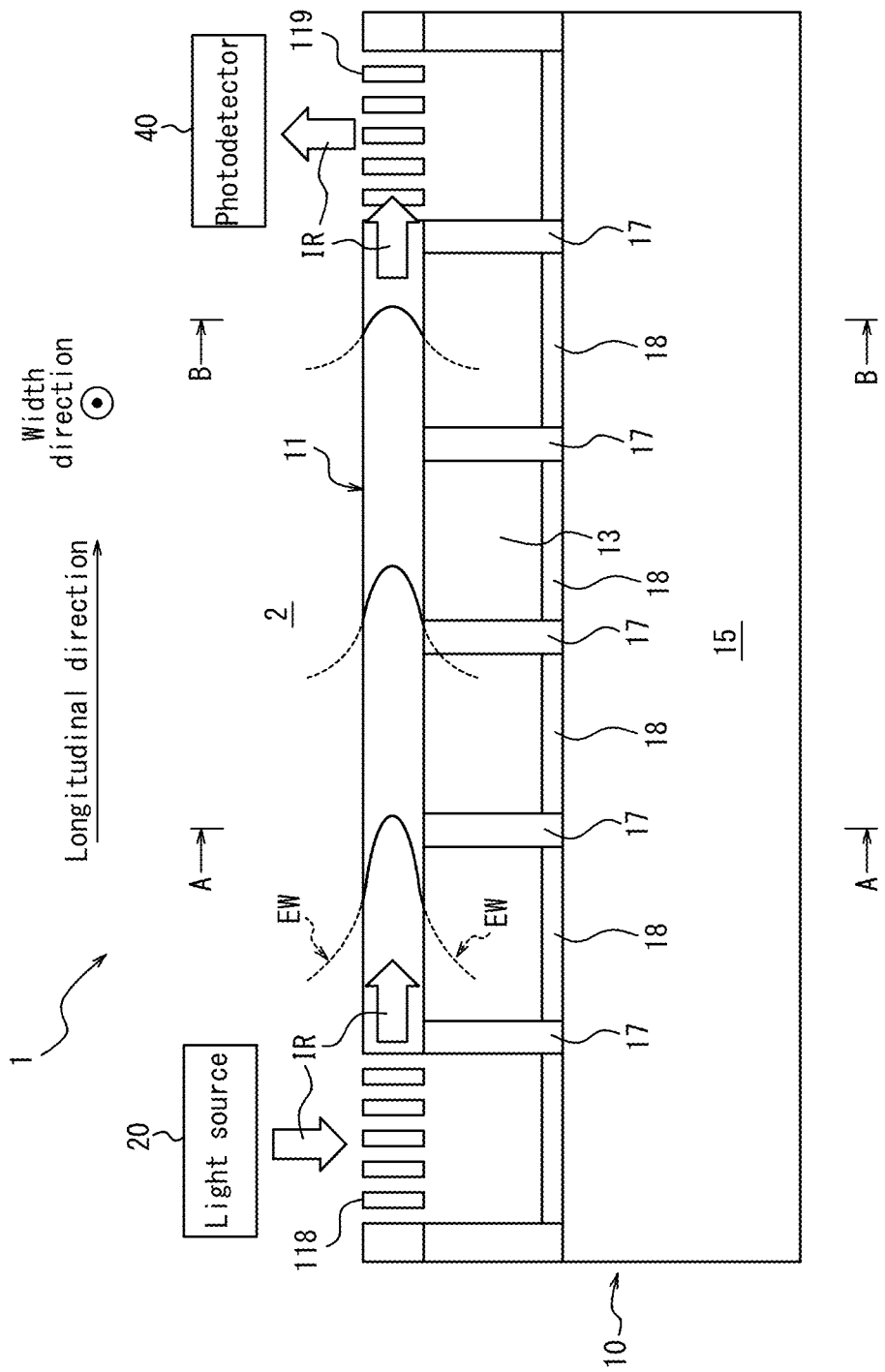
FIG. 1 is a diagram illustrating schematic configurations of an optical waveguide and an optical concentration measuring apparatus 1 according to a first embodiment of the present disclosure, for explaining sensing by the ATR method using the optical concentration measuring apparatus.

Hereinafter, embodiments of the present disclosure will be described. Note that the embodiments should not be construed as limiting the claimed subject matter. Also, the solution to problem according to the present disclosure does not necessarily need all combinations of features described in the embodiments.

First Embodiment

Optical Waveguide

An optical waveguide according to a first embodiment of the present disclosure is an optical waveguide used in an optical concentration measuring apparatus for measuring concentration of a target gas or a target liquid to be measured. The optical waveguide includes a substrate, a core layer that can transmit light and extends along a longitudinal direction, a support that connects at least a portion of the substrate and a portion of the core layer together and supports the core layer with respect to the substrate, and a protrusion that is arranged at a position different from a position of the support in a space between the substrate and the core layer and protrudes toward the core layer from the substrate in such a manner as to have a maximum height at a position deviated from a central position of the core layer in a width direction. Note that the longitudinal direction refers to a direction in which a three-dimensional structure having a shape extending along at least one direction extends the most. The longitudinal direction includes a curved direction as well as a linear direction. The position different from the position of the support in the space between the substrate and the core layer refers to a position in the space at which the support is not positioned in at least one of the longitudinal direction and the width direction. Also, the width direction refers to a direction perpendicular to the longitudinal direction of the core layer and parallel to a principal surface of the substrate in the present embodiment. The principal surface of the substrate refers to a surface perpendicular to the thickness direction of the substrate, i.e., the largest surface in the six surfaces forming the substrate. Further, the core layer may include a curved portion, and the protrusion may be arranged in a space between the curved portion of the core layer and the substrate, i.e., immediately below the curved portion of the core layer. The term "immediately below" refers to "straight under", provided that a direction from the core layer to the substrate is defined as the vertical direction. The protrusion may be arranged immediately below the core layer close to an inner periphery or an outer periphery of the core layer in the curved portion of the core layer.

Sensitivity of a sensor that employs the ATR method can be improved by increasing an interaction amount between the evanescent wave and a substance to be measured and reducing an amount of light absorbed by a material other than the substance to be measured. In order to reduce the amount of light absorbed by a material other than the substance to be measured, it is effective to arrange the supports for supporting the core layer in a portion of the surface of the core layer opposing the substrate in such a manner as to expose the most portion of the core layer. In a portion of the core layer that is not connected to the support and floats with respect to the substrate, sticking to the substrate may occur due to the meniscus force of water generated from condensation between the portion and the substrate. When such sticking occurs, the structure having a floating portion in a part of the waveguide cannot be maintained, and the sensitivity of the sensor is significantly deteriorated. As such, arranging an object on the surface of the substrate can reduce the occurrence of sticking. Although sticking is often regarded as a problem in devices equipped with so-called MEMS (Microelectromechanical systems) that include movable parts, structures that do not include movable parts also need to prevent sticking caused by the meniscus force as described above.

As an optical waveguide having this configuration, an optical waveguide that includes a substrate, a core layer arranged on the substrate, support portions that connect the substrate and a portion of the core layer together and intermittently support the core layer with respect to the substrate, and a protrusion protruding toward the core layer from the substrate can be conceived. In the optical waveguide having such a configuration, the protrusions prevent the core layer from sticking to the substrate, thus suppressing the occurrence of sticking. However, when the protrusion is arranged at the central position of the core layer in the width direction for the purpose of reliable formation of the protrusion between the substrate and the core layer, there is a risk that the evanescent wave extending with the maximum intensity in the vicinity of the central position of the core layer in the width direction is optically absorbed by the protrusion.

According to the optical waveguide of the present embodiment, the position of the maximum height of the protrusion protruding toward the core layer is deviated from the central position of the core layer in the width direction. That is, a portion of the protrusion closest to the core layer is located at a position deviated from the central position, through which the most part of light is transmitted, of the core layer in the width direction. According to the optical waveguide of the present embodiment, because the protrusion has the maximum height at a position deviated from the central position of the core layer in the width direction as described above, optical absorption of the evanescent wave by the protrusion can be reduced, and occurrence of sticking of the core layer can be suppressed. Thus, the optical concentration measuring apparatus that includes the optical waveguide according to the present embodiment can reduce the possible failure due to sticking and improve the measuring sensitivity and realize high sensitivity and high reliability. Also, the protrusion is arranged in a space between the curved portion of the core layer and the substrate. Thus, the optical waveguide according to the present embodiment can suppress the occurrence of sticking in the curved portion where sticking is more likely to occur than in a linear portion. Further, in the curved portion of the core layer, the protrusion is arranged immediately below the core layer at a position close to the inner periphery or the outer periphery of the core layer. The protrusion is more preferably arranged at a position close to the inner periphery of the core layer, because light transmitted through the curved portion of the core layer is slightly deviated toward the outer periphery of the core layer, depending on the radius of curvature of the core layer. The optical waveguide in which the protrusion is arranged immediately below the core layer at a position close to the inner periphery of the core layer in the curved portion of the core layer increases the distance between the protrusion and the transmitted light, and thus can further reduce the optical absorption of the evanescent wave by the protrusion. However, an optical waveguide in which the protrusion is arranged immediately below the core layer at a position close to the outer periphery of the core layer in the curved portion of the core layer also increases the distance between the protrusion and the transmitted light and thus has some effect. Note that, in the optical waveguide according to the present embodiment, the core layer does not need to include a movable portion.

Hereinafter, each constituent element of the optical waveguide will be described using specific examples.

Core Layer

The core layer may be any layer that extends in the longitudinal direction and can transmit light in the longitudinal direction. In particular, the core layer may be made of silicon (Si), gallium arsenide (GaAs), or germanium (Ge). The longitudinal direction refers to a direction in which a three-dimensional structure having a shape extending along at least one direction extends the most and includes a curved direction as well as a linear direction. A vertical cross-section at a given position along the longitudinal direction of the core layer is not limited to have a circular shape and may have any shape, including a rectangle shape, in which the distance between the center of the cross-section and the outer surface varies when the cross-section is rotated about a central axis thereof. Accordingly, the core layer has an elongated plate-like shape in the present embodiment.

At least a portion of the core layer may be exposed to be able to come into direct contact with the target gas or the target liquid, or may be covered with a thin film thinner than ¼ of a wavelength, in vacuum, of light transmitted through the core layer and be able to come into contact with the target gas or the target liquid via the thin film. This promotes the interaction between the evanescent wave and the target gas or the target liquid and enables measurement of the concentration of the target gas or the target liquid.

Also, the core layer may include the curved portion. This enables the aspect ratio of the contour of the core layer to approach 1 when the entire core layer is viewed in plan view, and miniaturization of the optical waveguide and the optical concentration measuring apparatus. Also, at least a portion of the core layer in the longitudinal direction includes an area that does not include a support, which will be descried later, in the entire region between the core layer and the substrate in a cross-section perpendicular to the longitudinal direction. This configuration can promote the interaction between the evanescent wave extending from the core layer and the gas or the liquid surrounding the optical waveguide. Note that "area that does not include the support" refers to a state in which the core layer forms a bridge between two supports adjacent to each other in the longitudinal direction. Further, "area that does not include the support" refers to a state in which the entire region, opposing the substrate, of the core layer has a gap or a medium, having lower absorptivity with respect to the light transmitted through the core layer than the support between the substrate and the entire region, between two supports adjacent to each other in the longitudinal direction.

The light transmitted through the core layer may be infrared radiation serving as an analog signal. Here, the infrared radiation serving as the analog signal is not for determination on an energy change of light between zero (low level) and 1 (high level) and represents a signal for an amount of the energy change of light. Thus, the optical waveguide according to each embodiment can be used for sensors and analysis equipment. In this case, the wavelength, in vacuum, of the infrared radiation may be 2 μm to 12 μm. This is a wavelength band absorbed by gasses ($CO_2$, NO, $N_2O$, $SO_2$, $CH_4$, $H_2O$, $C_2H_6O$, and the like) that are typically floating in the environment. Accordingly, the optical waveguide according to each embodiment can be used as a gas sensor.

Substrate

The substrate may be any substrate on which the support, the protrusion, and the core layer can be formed. In particular, the substrate may be a silicon substrate or a GaAs substrate. The principal surface of the substrate refers to the surface of the substrate extending in a horizontal direction (a direction perpendicular to the film thickness direction). The surface of the substrate does not need to be exposed and may be partially covered with a thin film made of the same material as the support and the protrusion. When the surface of the substrate is not exposed, the height of the protrusion described later refers to the height of the surface of the protrusion from the lowest position of the thin film surface in the area immediately below the core layer, rather than the height of the surface of the protrusion from the surface of the substrate.

Support

The support connects at least a portion of the substrate and a portion of the core layer together. The support supports the core layer with respect to the substrate.

The support may be any support capable of connecting the substrate and the core layer together and is preferably made of a material that has a smaller refractive index than the core layer with respect to light of any wavelength or light transmitted through the core layer. The material of the support may be, for example, silicon oxide film ($SiO2$), silicon (Si), gallium arsenide (GaAs), or the like. The index of refraction is the index of refraction with respect to light of any wavelength or light of a particular wavelength. The light of a particular wavelength is, in particular, the light transmitted through the core layer of the optical concentration measuring apparatus. In this way, the support can reflect the entire light transmitted through the core layer at the connecting portion connected to the core layer.

The connecting portion between the support and the core layer may be positioned at any position on the surface, opposing the substrate, of the core layer including, for example, a central portion in the width direction. Also, the connecting portion between the support and the core layer may be at any position on the end surface of the core layer in the width direction. Also, the connecting portion between the support and the core layer may be intermittently arranged along the longitudinal direction of the core layer. This configuration enlarges the outer surface that does not contact the support in a portion of the core layer in the longitudinal direction, and thus can enlarge an interaction area between the evanescent wave and the target gas or the target liquid. Further, the connecting portion between the support and the core layer may have a shape extending in the longitudinal direction of the core layer as it is positioned closer to the central position of the core layer away from the edge portion of the core layer in the width direction. By virtue of this shape, the surrounding conditions of the core layer gradually change along the longitudinal direction of the core layer from an area that does not include the support to an area that includes the support (or vice versa). Thus, a sudden change of the surrounding conditions for the light transmitted through the core layer can be avoided, and a scattering loss of the light transmitted through the core layer can be reduced.

A method for forming the support is, for example, etching a BOX (Buried Oxide) layer in the SOI (Silicon On Insulator) substrate, whereby a structure in which the core layer (Si layer) is supported by the BOX layer with respect to the substrate (Si layer) can be formed.

Protrusion

The protrusion is arranged at a position different from a position of the support in a space between the substrate and the core layer. The protrusion has a maximum height at a position deviated from the central position of the core layer in the width direction. Note that the protrusion does not need to have a maximum height at a position deviated from the central position of the core layer in the width direction over the entire region of the core layer in the longitudinal direction. For example, the protrusion may have a maximum height at a position deviated from the central position of the core layer in the width direction at least in a portion of the core layer in the longitudinal direction, and have a maximum height at the central position of the core layer in the width direction in another portion. The protrusion protrudes toward the core layer from the substrate. "The position different from the position of the support between the substrate and the core layer" refers to a position in a space between the substrate and the core layer that does not include the support at least in one of the longitudinal direction and the width direction.

The protrusion may be formed from the same material as the support. This facilitates the formation of the protrusion arranged in an area overlapping with the support in the thickness direction of the core layer by employing the lithography technology and the etching technology. Also, the protrusion may have a mountain-like shape. Thus, in a configuration in which the core layer has, for example, a rectangular shape in a plane perpendicular to the longitudinal direction, the bottom surface of the core layer and the surface of the protrusion having the mountain-like shape are not in parallel with each other, and sticking between the core layer and the protrusion is unlikely to occur. When the protrusion does not have a mountain-like shape, a similar effect can be obtained by virtue of that the bottom surface of the core layer and the surface of the protrusion opposing the core layer are not in parallel with each other. Note that the mountain-like shape of the protrusion is a shape of the protrusion viewed from any direction perpendicular to the thickness direction of the core layer, e.g., from the longitudinal direction of the core layer. Although the protrusion may have an asymmetrical shape in the width direction of the core layer, the protrusion preferably has a symmetrical shape. The symmetrical shape in the width direction of the core layer means a line-symmetrical shape with a straight line perpendicular to the width direction serving as the axis of symmetry. Thus, in a configuration in which the core layer is symmetrical in the width direction and the protrusion is also symmetrical in the width direction, when light transmits to the core layer in an area that includes the protrusion immediately below the core layer from the care layer in an area that does not include the protrusion immediately below the core layer, mode conversion of light is suppressed, and transmission loss due to the mode conversion is reduced. The protrusion may have a maximum height at a position deviated from the central position of the core layer in the width direction by 3% or more of the width of the core layer, preferably by 10% or more, more preferably by 20% or more, and further preferably by 30% or more. Also, the protrusion may have a maximum height at a position deviated from the central position of the core layer in the width direction by 100 nm or more, preferably by 300 nm or more, more preferably by 600 nm or more, and further preferably by 900 nm or more. Thus, a ratio of the extended evanescent wave that reaches the protrusion can be reduced. The more the position of the maximum height of the protrusion is deviated from the central position of the core layer in the width direction, the more the optical absorption of the evanescent wave by the protrusion can be reduced. The maximum height of the protrusion may be 1/20 or more of the distance between the core layer and the substrate. This configuration can suppress the occurrence of sticking of the core layer. The maximum height of the protrusion may be 100 nm or more. This configuration can further suppress the occurrence of sticking of the core layer. Further, the protrusions may be intermittently arranged along the longitudinal direction of the core layer. This configuration reduces a total length of the protrusion in the longitudinal direction, and thus can further suppress the optical absorption of the evanescent wave by the protrusion.

Optical Concentration Measuring Apparatus

An optical concentration measuring apparatus according to the present embodiment includes the optical waveguide according to the present embodiment, a light source capable of irradiating light into the core layer, and a detector capable of detecting light transmitted through the core layer.

Each constituent element of the optical concentration measuring apparatus will be described below with specific examples.

Light Source

The light source may be any light source capable of irradiating light into the core layer. When infrared radiation is used for the measurement of a gas, an incandescent bulb, a ceramic heater, a MEMS (Microelectromechanical systems) heater, an infrared LED (Light-Emitting Diode), or the like can be used as the light source. The light source may be arranged in any manner that can be optically connected to the optical waveguide. For example, the light source may be arranged adjacent to the optical waveguide in the same constituent element, or may be arranged at a certain distance from the optical waveguide as a different constituent element. When ultraviolet rays are used for the measurement of a gas, a mercury lamp, an ultraviolet LED, or the like can be used as the light source. When x-rays are used for the measurement of a gas, an electron beam, an electron laser, or the like can be used as the light source.

The light transmitted through the core layer of the optical waveguide provided in the optical concentration measuring apparatus may be infrared radiation serving as an analog signal. Here, the infrared radiation serving as the analog signal is not for determination on an energy change of light between zero (low level) and 1 (high level), and represents a signal for an amount of the energy change of light. Thus, the optical concentration measuring apparatus can be used for sensors and analysis equipment. In this case, the wavelength, in vacuum, of the infrared radiation may be 2 μm to 12 μm. This is the wavelength band absorbed by gasses ($CO_2$, CO, NO, $N_2O$, $SO_2$, $CH_4$, $H_2O$, $C_2H_6O$, and the like) that are typically floating in the environment. Accordingly, the optical concentration measuring apparatus according to the present embodiment can be used as a gas sensor.

Detector

The detector may be any detector capable of receiving light transmitted through the core layer of the optical waveguide. When infrared radiation is used for the measurement of a gas, a thermal infrared sensor such as a pyroelectric sensor, a thermopile, or a bolometer, or a quantum infrared sensor such as a diode or a phototransistor may be used as the detector. When ultraviolet rays are used for the measurement of a gas, a quantum ultraviolet sensor such as a diode or a phototransistor may be used as the detector. When x-rays are used for the measurement of a gas, various types of a semiconductor sensor may be used as the detector.

The optical waveguide and the optical concentration measuring apparatus according to the present embodiment will be described with reference to FIG. 1 to FIG. 15.

FIG. 1 is a diagram illustrating a schematic configuration of an optical concentration measuring apparatus 1 according to the present embodiment and is also a conceptual drawing of the ATR method using an optical waveguide 10 according to the present embodiment.

As illustrated in FIG. 1, the optical concentration measuring apparatus 1 is installed and used in an external space 2 that includes a gas whose concentration or the like is to be detected. The optical concentration measuring apparatus 1 includes the optical waveguide 10 according to the present embodiment, a light source 20 capable of irradiating light (infrared radiation IR in the present embodiment) into a core layer 11 provided in the optical waveguide 10, and a photodetector (an example of a detector) 40 capable of receiving the infrared radiation IR transmitted through the core layer 11.

The optical waveguide 10 includes a substrate 15, the core layer 11 that can transmit the infrared radiation IR (an example light), supports 17 each of which intermittently connects at least a portion of the substrate 15 and a portion of the core layer 11 together and thus supports the core layer 11 with respect to the substrate 15, and protrusions 18 that protrude toward the core layer 11 from the substrate 15. The core layer 11 and the substrate 15 are made of silicon (Si), and the supports 17 and the protrusions 18 are made of silicon dioxide ($SiO_2$).

Figure 2:
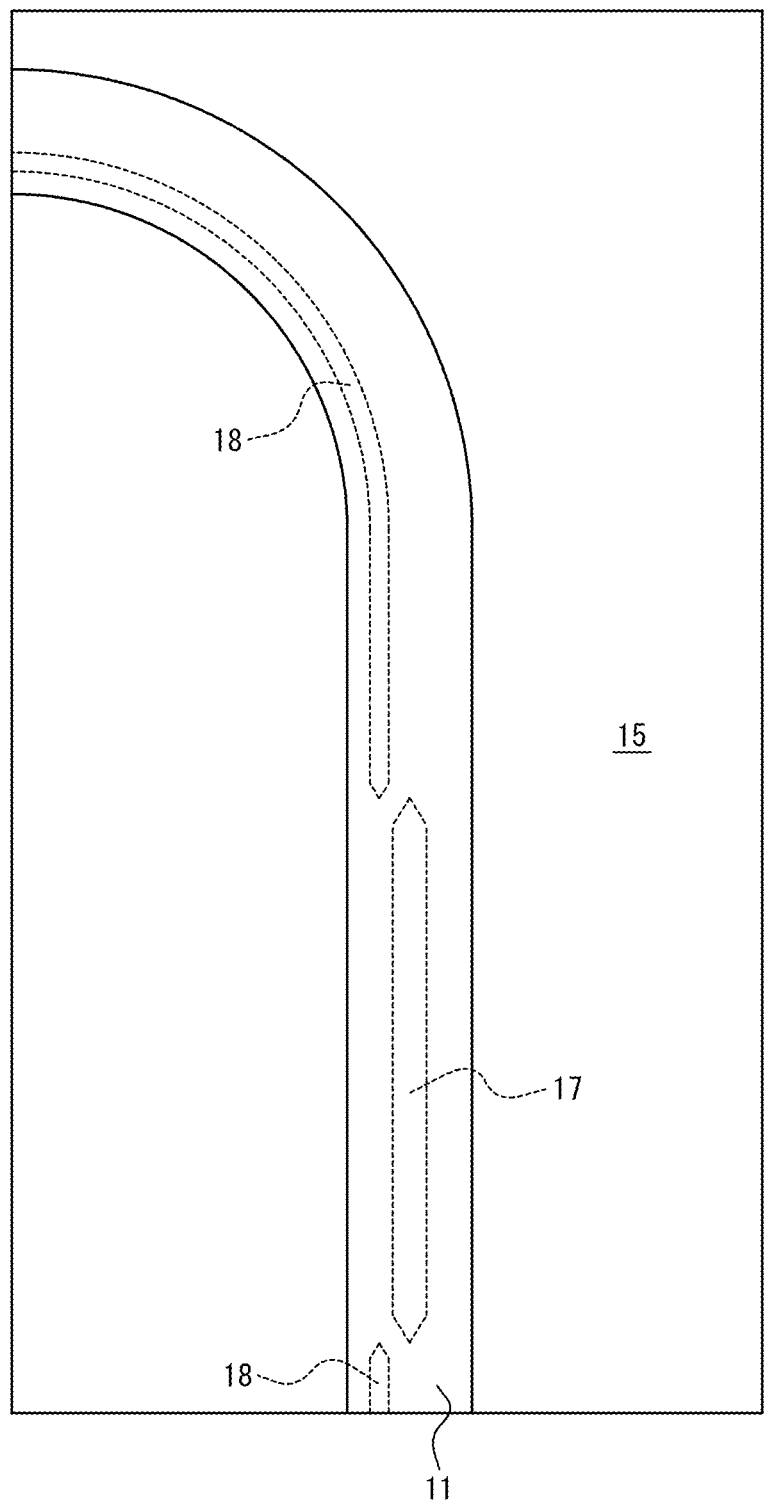
FIG. 2 is a plan view illustrating a part of a structure of the optical waveguide according to the first embodiment of the present disclosure, viewing a part of the optical waveguide from a light source side or a photodetector side with respect to a principal surface of a substrate.

The substrate 15 has, for example, a plate-like shape. The core layer 11 is, for example, a rectangular parallelepiped in part. The core layer 11 includes a curved portion in which the rectangular parallelepiped is curved about an axis in a direction perpendicular to a principle surface of the substrate 15, as illustrated in FIG. 2.

As illustrated in FIG. 1, the optical waveguide 10 includes a grating coupler 118 formed at one end of the core layer 11 in the longitudinal direction and a grating coupler 119 formed at the other end of the core layer 11 in the longitudinal direction. The grating coupler 118 is arranged in the irradiating direction of the light source 20. In the present embodiment, the optical waveguide 10 is arranged such that the stacking direction therein is parallel to the vertical direction, and the principle surface of the substrate 15 is directed in the vertically downward direction. The irradiating direction of the light source 20 is vertically downward from the light source 20 in a state in which the optical waveguide 10 is installed in the above manner. The grating coupler 118 couples the infrared radiation IR irradiated by the light source 20 with the infrared radiation IR transmitted through the core layer 11. The grating coupler 119 is arranged in a direction facing the photodetector 40. Note that "direction facing the photodetector 40" is a direction vertically downward from the photodetector 40 in a state in which the optical waveguide 10 is installed in the above manner. The grating coupler 119 is configured to extract the infrared radiation IR transmitted through the core layer 11 and pass the extracted infrared radiation IR to the photodetector 40.

Figure 3:
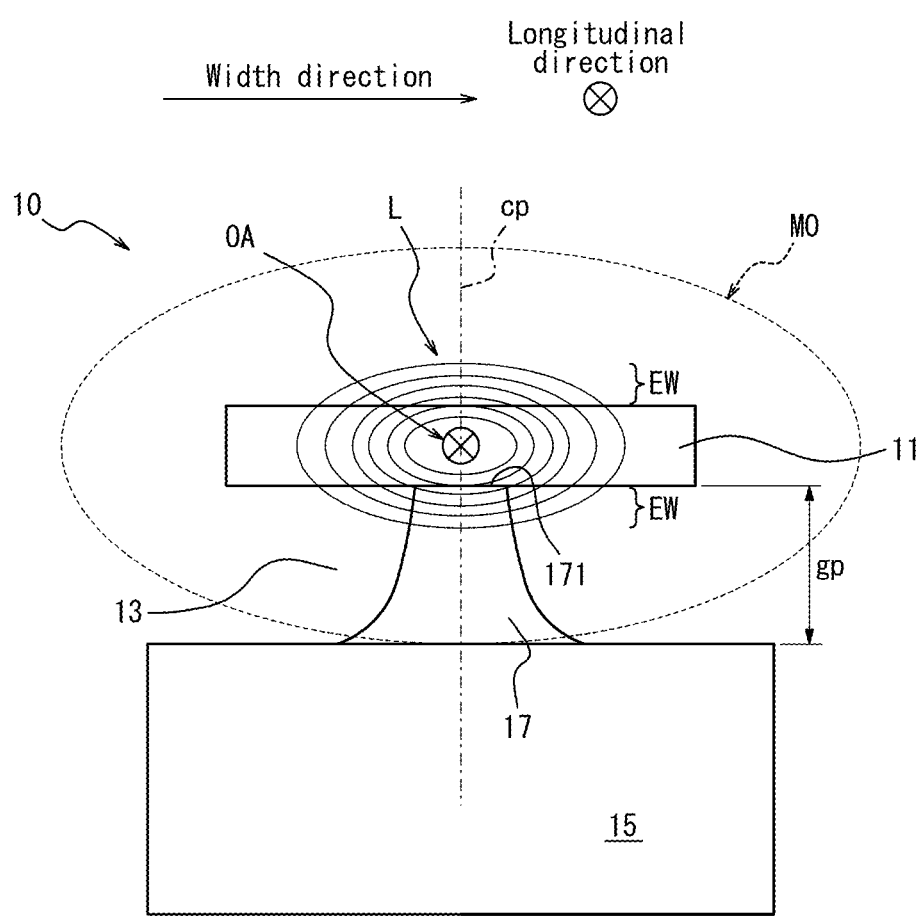
FIG. 3 is a cross-sectional end view of the optical waveguide taken from line A-A in FIG. 1, for illustrating a schematic configuration of the optical waveguide according to the first embodiment of the present disclosure.
Figure 4:
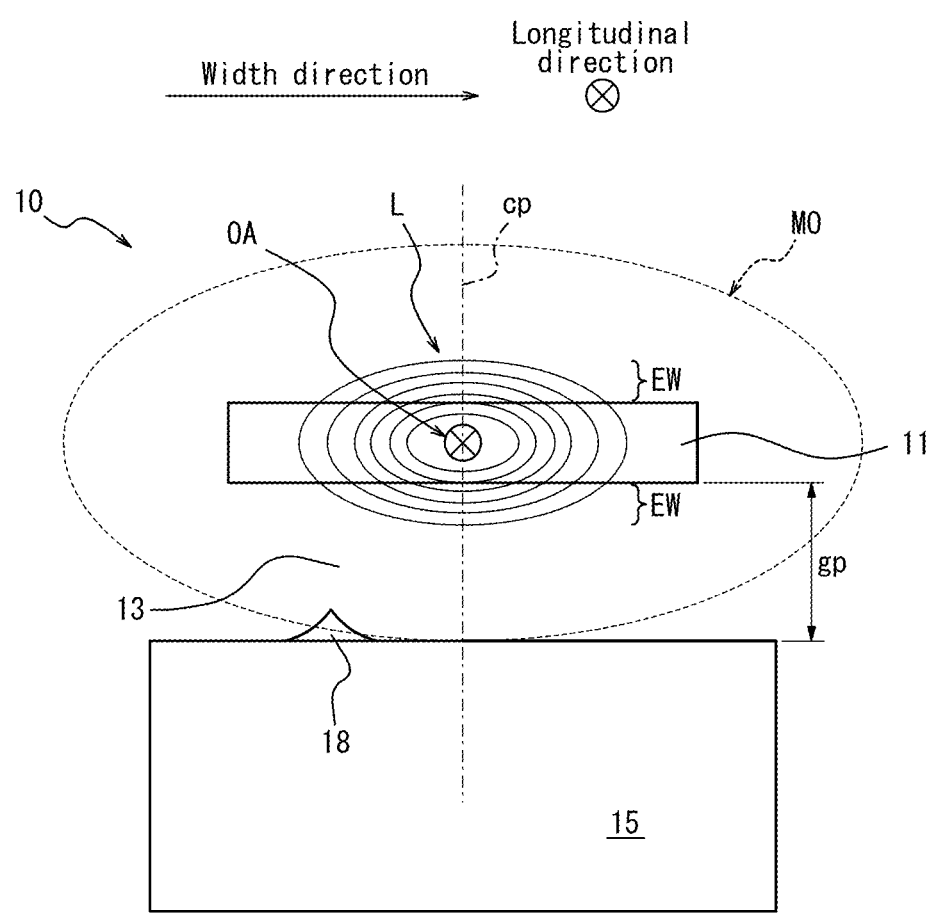
FIG. 4 is a cross-sectional end view of the optical waveguide taken from line B-B in FIG. 1, for illustrating a schematic configuration of the optical waveguide according to the first embodiment of the present disclosure.

FIG. 3 is a cross-sectional end view of the optical waveguide 10 taken from line A-A in FIG. 1, and FIG. 4 is a cross-sectional end view of the optical waveguide 10 taken from line B-B in FIG. 1.

As illustrated in FIG. 1, FIG. 3, and FIG. 4, the optical waveguide 10 includes gaps 13 between the core layer 11 and the substrate 15 without having a predetermined layer such as a clad layer, except for the areas that include the supports 17.

As illustrated in FIG. 3, a connecting portion 171 of the support 17 connected to the core layer 11 overlaps with the central position cp of the core layer 11 in the width direction. As illustrated in FIG. 1, also, the connecting portions 171 of the supports 17 are intermittently arranged along the longitudinal direction.

As illustrated in FIG. 1 and FIG. 2, in the longitudinal direction of the core layer 11, the protrusions 18 are arranged at positions different from positions of the supports 17 in the gap between the substrate 15 and the core layer 11. As illustrated in FIG. 3 and FIG. 4, also, in the width direction of the core layer 11, the protrusions 18 are arranged at positions different from positions of the supports 17 in the gap. Each of the protrusions 18 has a maximum height at a position deviated from the central position cp of the core layer 11 in the width direction. Each of the protrusions 18 has a mountain-like shape as viewed from the longitudinal direction of the core layer 11. Each of the protrusions 18 has a symmetrical shape in the width direction of the core layer 11. Each of the protrusions 18 has a maximum height at a position deviated from the central position cp of the core layer in the width direction by 3% or more of the width of the core layer 11. The maximum height of the protrusions 18 is 1/20 or more of a gap gp between the core layer 11 and the substrate 15, which is 100 nm or more, in particular. As illustrated in FIG. 1 and FIG. 2, the protrusion 18 is also arranged immediately below the curved portion of the core layer 11 along the longitudinal direction. In the curved portion of the core layer 11, the protrusion 18 is arranged immediately below the core layer 11 at a position deviated toward the inner periphery or the outer periphery of the core layer 11 (toward the inner periphery in FIG. 2). In the curved portion of the core layer 11, the protrusion 18 extends along the curved portion of the core layer 11 as viewed from the thickness direction of the core layer 11.

Figure 5:
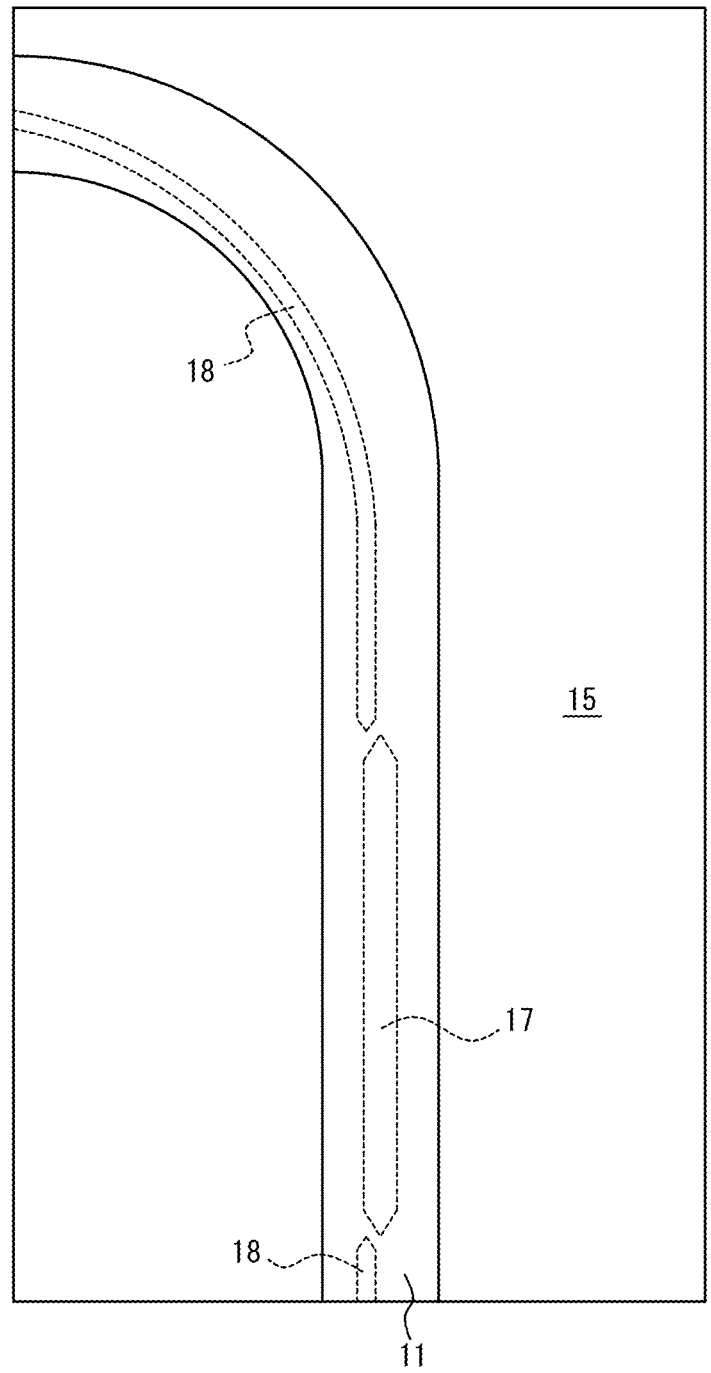
FIG. 5 is a plan view illustrating a portion of a structure of the optical waveguide according to a variation of the first embodiment of the present disclosure, viewing a portion of the optical waveguide from a light source side or a photodetector side with respect to the principal surface of the substrate.

Note that the protrusion 18 arranged in the curved portion of the core layer 11 does not need to extend along the curve of the core layer 11. As illustrated in FIG. 5, for example, the protrusion 18 may be curved having a radius of curvature different from that of the curved portion and arranged such that a portion of the protrusion 18 is close to the inner periphery or the outer periphery of the core layer 11.

Figure 19:
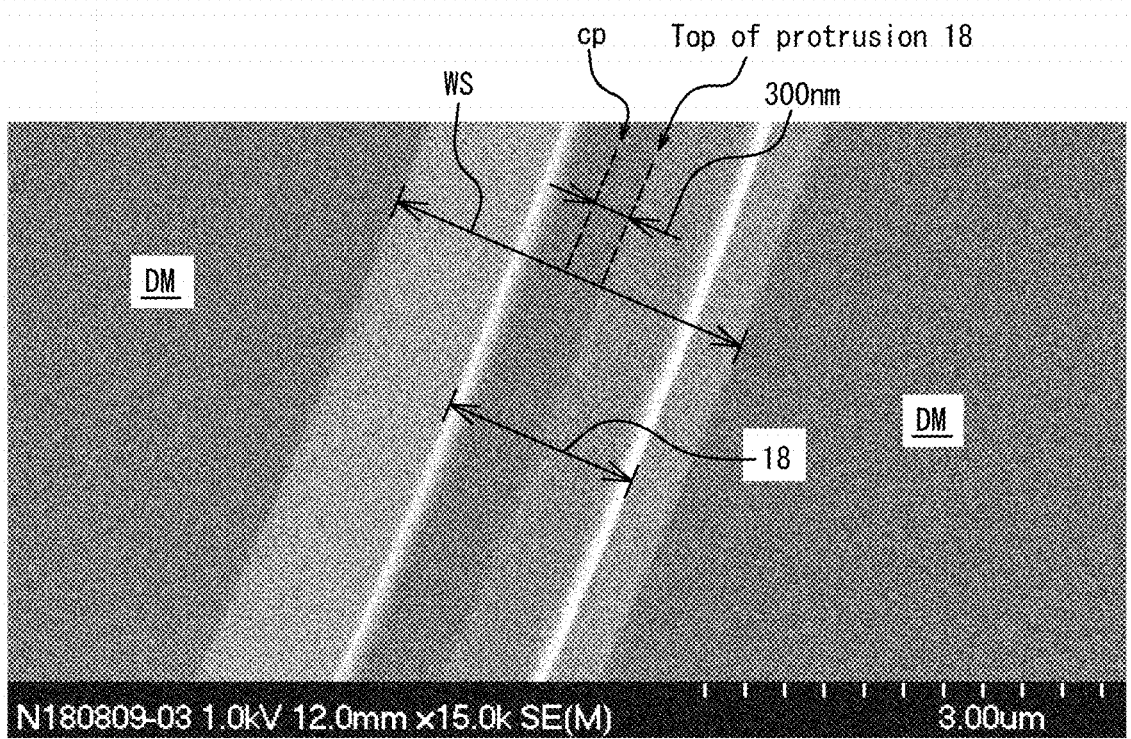
FIG. 19 is a plan view illustrating a result of observation analysis by an electron microscope, which includes the optical waveguide according to the first embodiment of the present disclosure, for illustrating deviation between a top position of the protrusion in the width direction and a central position of the shadow of the core layer in the width direction.

The shape of the protrusions 18 and the positions of the protrusions 18 with respect to the width direction of the core layer 11 can be observed in the following manner. To observe a cross-sectional shape of a protrusion 18, a SEM (scanning electron microscope) is used to observe a plane perpendicular to the longitudinal direction. To observe a relative position between the protrusion 18 and the core layer 11 in the width direction, a damaged layer DM is formed by emitting an FIB (Focused Ion Beam) from a side of the core layer 11 of the optical waveguide 10 such that a shadow WS of the core layer 11 is transferred onto the substrate. Then, the core layer 11 is peeled off, and the shadow WS, transferred to the peeled surface, of the core layer 11 and the protrusion 18 are observed using the SEM. In particular, the FIB is emitted in the direction perpendicular to the principle surface of the substrate 15 at a portion where the core layer 11 is floating. Thus, the shadow WS of the core layer 11 is transferred onto the substrate 15 by the damaged layer DM generated by the FIB. The transferred shadow WS of the core layer 11 indicates the position of the core layer 11 in a plane parallel to the principle surface of the substrate 15. Thus, by comparing the transferred shadow WS of the core layer 11 and the position of the protrusion 18, the relative position between the protrusion 18 and the core layer 11 can be determined. FIG. 19 illustrates the shadow WS of the core layer 11 and the protrusion 18 actually observed by employing the above method. When the principle surface of the substrate 15 is observed using the SEM, there is a clear difference in the contrasts between an area where the damaged layer DM generated by the FIB is formed and an area of the shadow WS, where the damaged layer DM was not generated by the FIB, of the core layer 11. It was observed that there was a 300 nm deviation in the width direction between the line indicating the peak of the protrusion 18 having the mountain-like shape and the central position cp of the shadow WS, transferred onto the substrate 15, of the core layer 11 in the width direction. That is, it can be seen that the protrusion 18 is formed protruding toward the core layer 11 from the substrate 15 and has a maximum height at a position deviated from the central position cp of the core layer 11 in the width direction.

Figure 18:
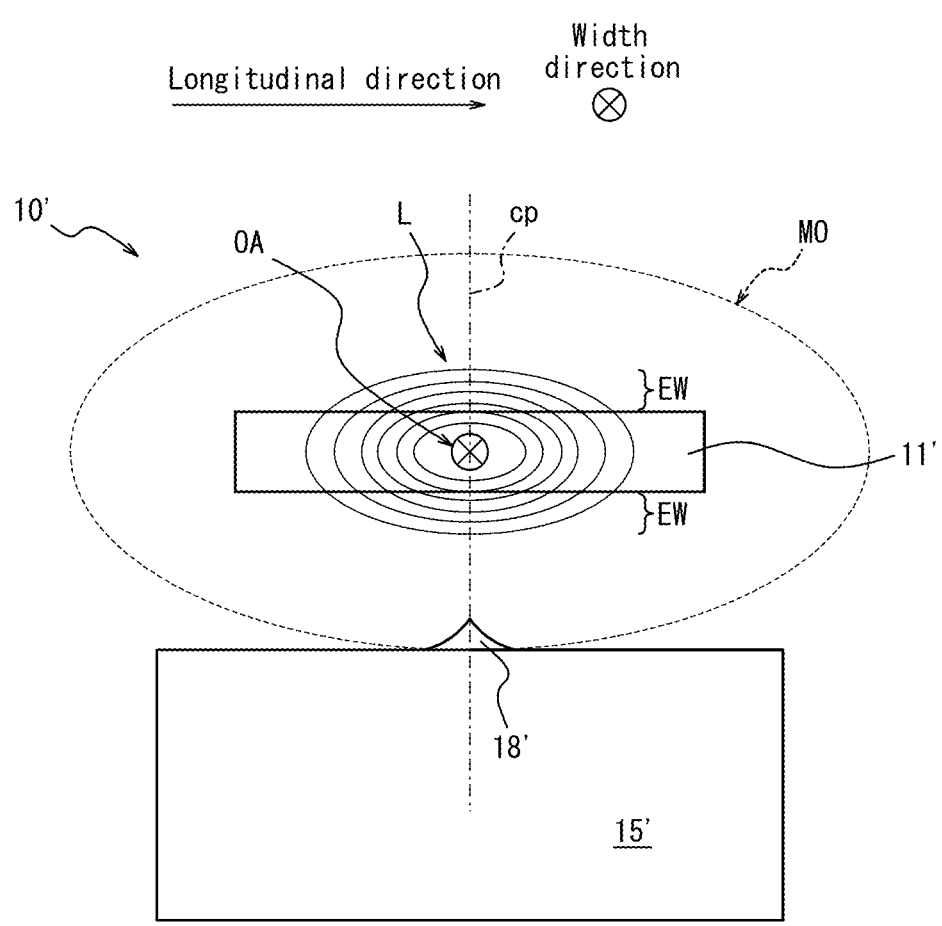
FIG. 18 is a diagram illustrating an optical waveguide that includes intermittent supports having protrusions therebetween.

Here, an effect of the optical waveguide 10 according to the present embodiment will be described by comparing with an optical waveguide 10' that includes a protrusion 18' arranged at the central position cp in the width direction as illustrated in FIG. 18.

A sensor that employs the ATR method is often set to transmit light in a single mode within the core layer. In the example of the optical concentration measuring apparatus 1 according to the present embodiment, light (infrared radiation) is transmitted in the single mode within the core layer 11 provided in the optical waveguide 10. Note that, when light is transmitted in a multi-mode, some light components are transmitted through the center of the core layer, whereby the effect of the present disclosure can be obtained. As illustrated in FIG. 3 and FIG. 4, when the infrared radiation IR is transmitted through the core layer 11 in the single mode, the optical axis OA of the infrared radiation IR is positioned at an approximate center of the core layer 11 in a cross-section orthogonal to the longitudinal direction, which is the transmission direction of the infrared radiation IR. At this time, an amount of an evanescent wave EW extending around the core layer 11 increases near the outer surface of the core layer 11 close to the optical axis OA. Thus, the amount of the evanescent wave EW reaches maximum in the vicinity of the central position cp in the width direction in the space between the core layer 11 and the substrate 15. The distribution of the evanescent wave EW of the infrared radiation IR transmitted through the core layer 11' of the optical waveguide 10' that includes the protrusion 18' at the central position cp in the width direction as illustrated in FIG. 18 is similar to the distribution obtained using the optical waveguide 10 of the present embodiment.

In a sensor employing the ATR method, the sensitivity of the sensor is improved by expanding a region of interaction between the evanescent wave extending from the core layer and the substance to be measured (that is, by increasing an exposed portion of the core layer) and suppressing optical absorption by materials other than the substance to be measured (that is, absorption of light by the support or the like). Arranging the protrusion 18' formed for the purpose of suppressing occurrence of sticking at the central position cp of the core layer 11' in the width direction as illustrated in FIG. 18 can be considered as a simplest configuration.

In the optical waveguide 10', however, because the protrusion 18' is arranged at the central position cp of the core layer 11' in the width direction between the core layer 11' and the substrate 15' in a plane orthogonal to the longitudinal direction, i.e., in the transmitting direction of the light L (i.e., in the cross-section illustrated in FIG. 18), the evanescent wave EW is absorbed most significantly by the material forming the protrusion 18'. As a result, the sensitivity of the sensor using the optical waveguide 10' is deteriorated.

As illustrated in FIG. 2 and FIG. 4, the optical waveguide 10 according to the present embodiment has a structure similar to the optical waveguide 10', in which the protrusions 18 are provided in the space between the core layer 11 and the substrate 15 to suppress the occurrence of sticking. In a cross-section perpendicular to the longitudinal direction, the core layer 11 has a symmetrical structure with respect to the center thereof. When the infrared radiation IR transmitted through the core layer 11 is in the single mode, the optical axis OA of the infrared radiation IR transmitted through the core layer 11 overlaps with the center of the core layer 11. As such, the protrusion 18 is positioned deviated from the central position cp of the core layer 11 in the width direction toward one of the peripheries as illustrated in FIG. 2. Thus, the protrusion 18 can be positioned deviated from the area where the evanescent wave EW is most concentrated. That is, the position of the maximum height of the protrusion 18 is not positioned at the central position cp of the core layer 11 in the width direction in the cross-section perpendicular to the longitudinal direction. Further, the core layer 11 includes the curved portion for the purpose of miniaturization of the optical waveguide 10 in its entirety, and the protrusion 18 is arranged immediately below the core layer 11 in the curved portion. Thus, the optical waveguide 10 can enhance durability against sticking in the curved portion, which otherwise has lower durability against sticking than the linear portion, of the core layer. Further, the protrusion 18 is disposed immediately below the core layer 11 at a position close to the inner periphery or the outer periphery of the core layer 11 in the curved portion of the core layer 11 (close to the inner periphery in FIG. 2). In the curved portion of the core layer 11, the light transmitted therethrough is located slightly close to the outer periphery of the core layer 11, depending on the radius of curvature of the core layer 11. Thus, it is preferable to arrange the protrusion 18 at a position close to the inner periphery of the core layer 11. In the optical waveguide 10 having a configuration in which the protrusion 18 is arranged at a position close to the inner periphery immediately below the core layer 11 in the curved portion, the distance between the protrusion 18 and the infrared radiation IR transmitted through the core layer 11 is increased. Thus, the optical absorption of the evanescent wave EW by the protrusion 18 can be further reduced. However, in a configuration in which the protrusion 18 is disposed close to the outer periphery of the core layer 11, the distance between the protrusion 18 and the infrared radiation IR transmitted through the core layer 11 is increased in a similar manner, whereby the same effect can be obtained to a certain extent.

Figure 6:
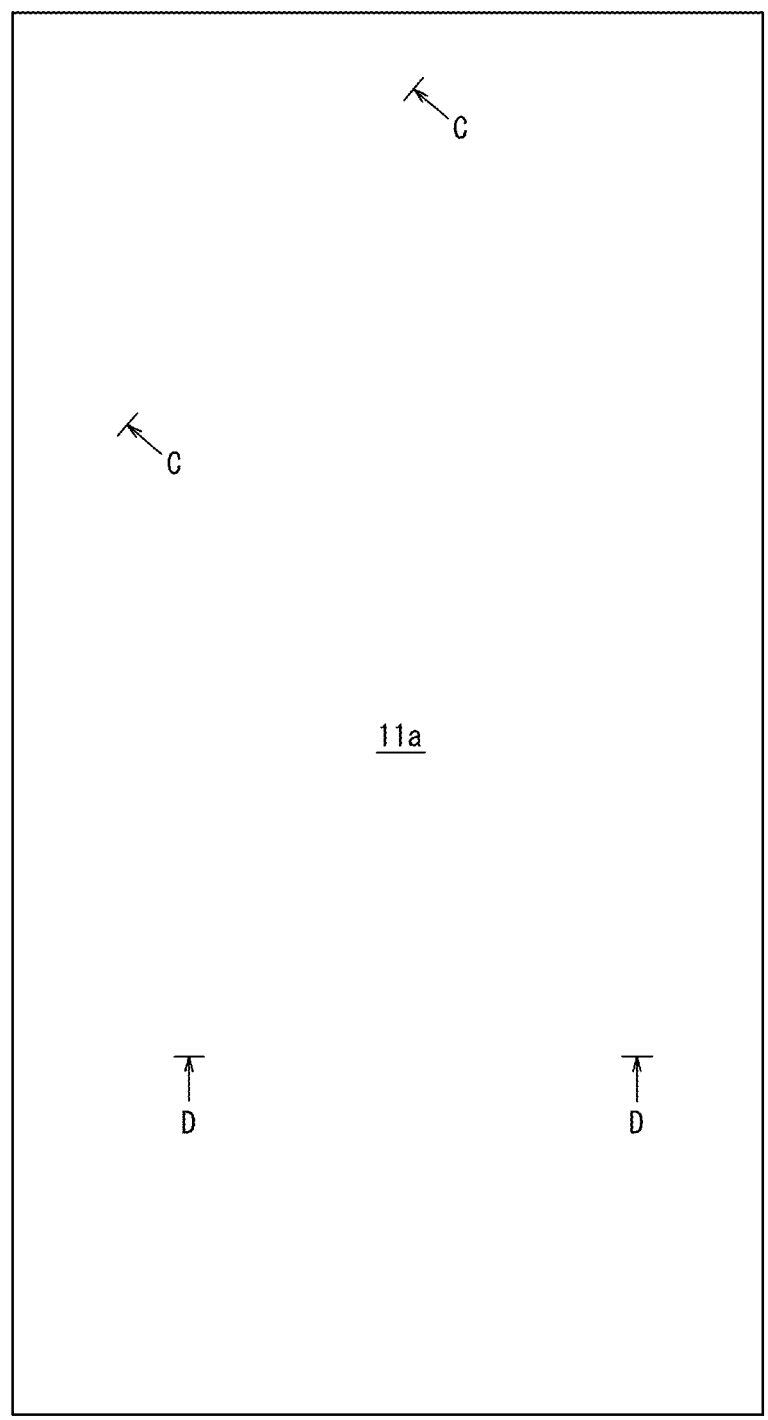
FIG. 6 is a plan view of a SOI substrate for illustrating a method for manufacturing the optical waveguide according to the first embodiment of the present disclosure.
Figure 7:
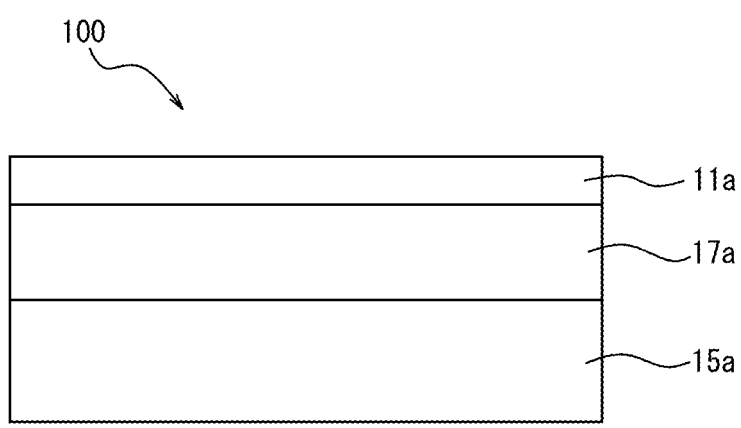
FIG. 7 is a cross-sectional end view of the SOI substrate taken from lines C-C and D-D in FIG. 6.
Figure 8:
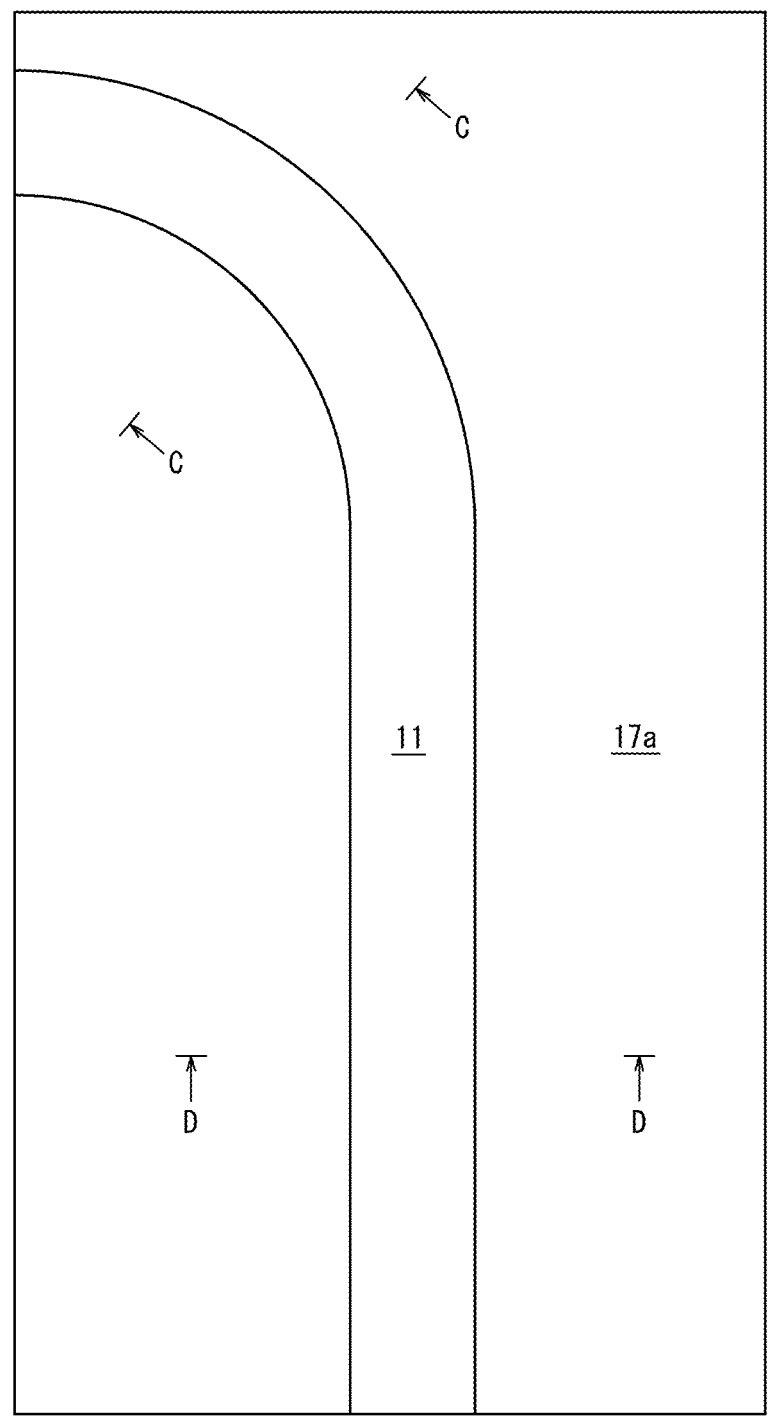
FIG. 8 is a plan view of an optical waveguide main portion for illustrating a method for manufacturing the optical waveguide according to the first embodiment of the present disclosure.
Figure 9:
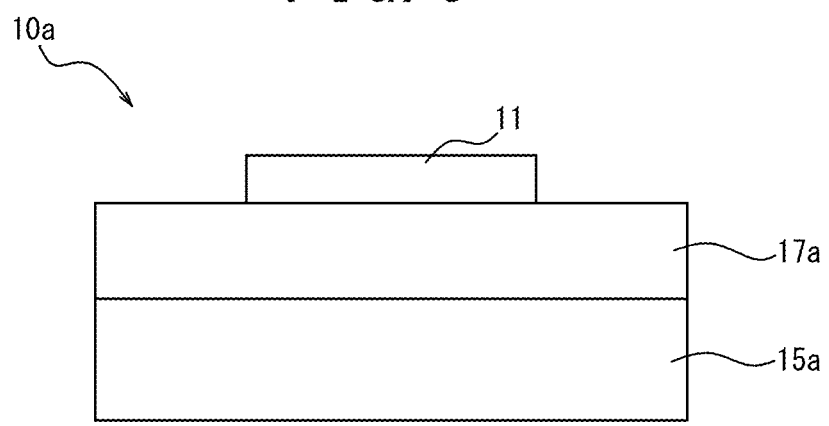
FIG. 9 is a cross-sectional end view of the optical waveguide main portion taken from lines C-C and D-D in FIG. 8.
Figure 10:
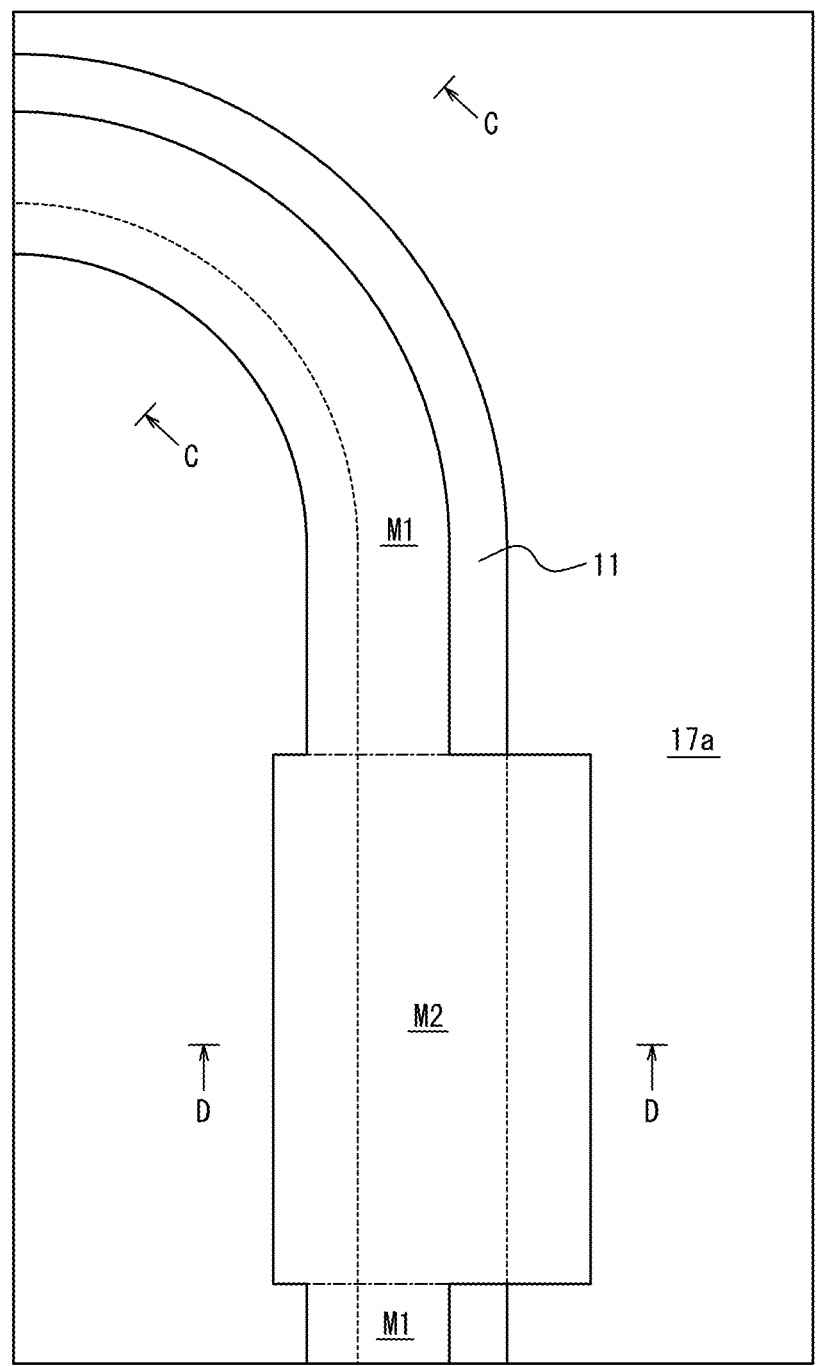
FIG. 10 is a plan view of the optical waveguide main portion partially covered with a mask pattern, for illustrating the method for manufacturing the optical waveguide according to the first embodiment of the present disclosure.
Figure 11:
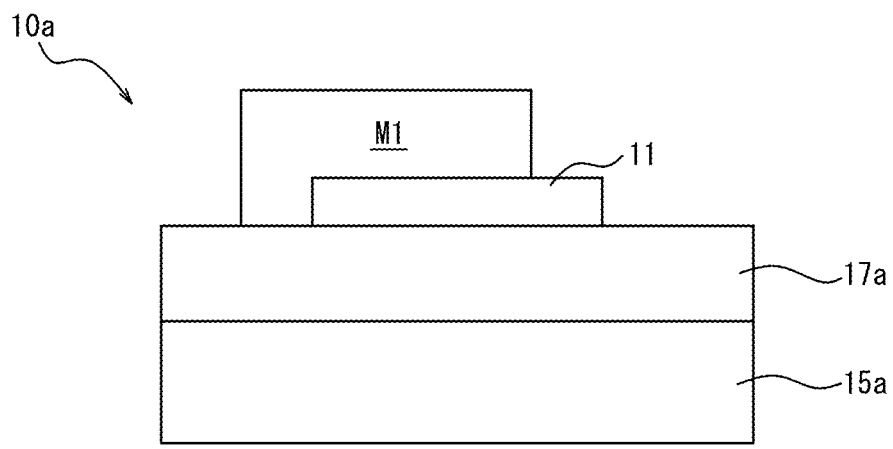
FIG. 11 is a cross-sectional end view of the optical waveguide main portion taken from line C-C in FIG. 10.
Figure 12:
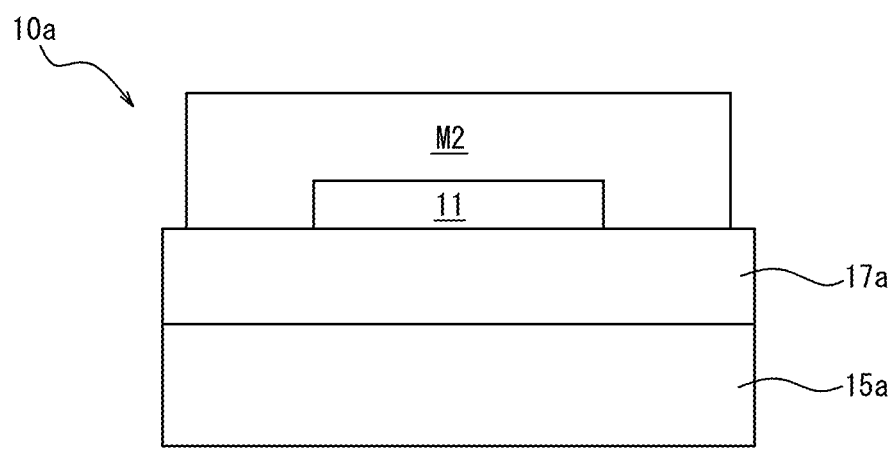
FIG. 12 is a cross-sectional end view of the optical waveguide main portion taken from line D-D in FIG. 10.
Figure 13:
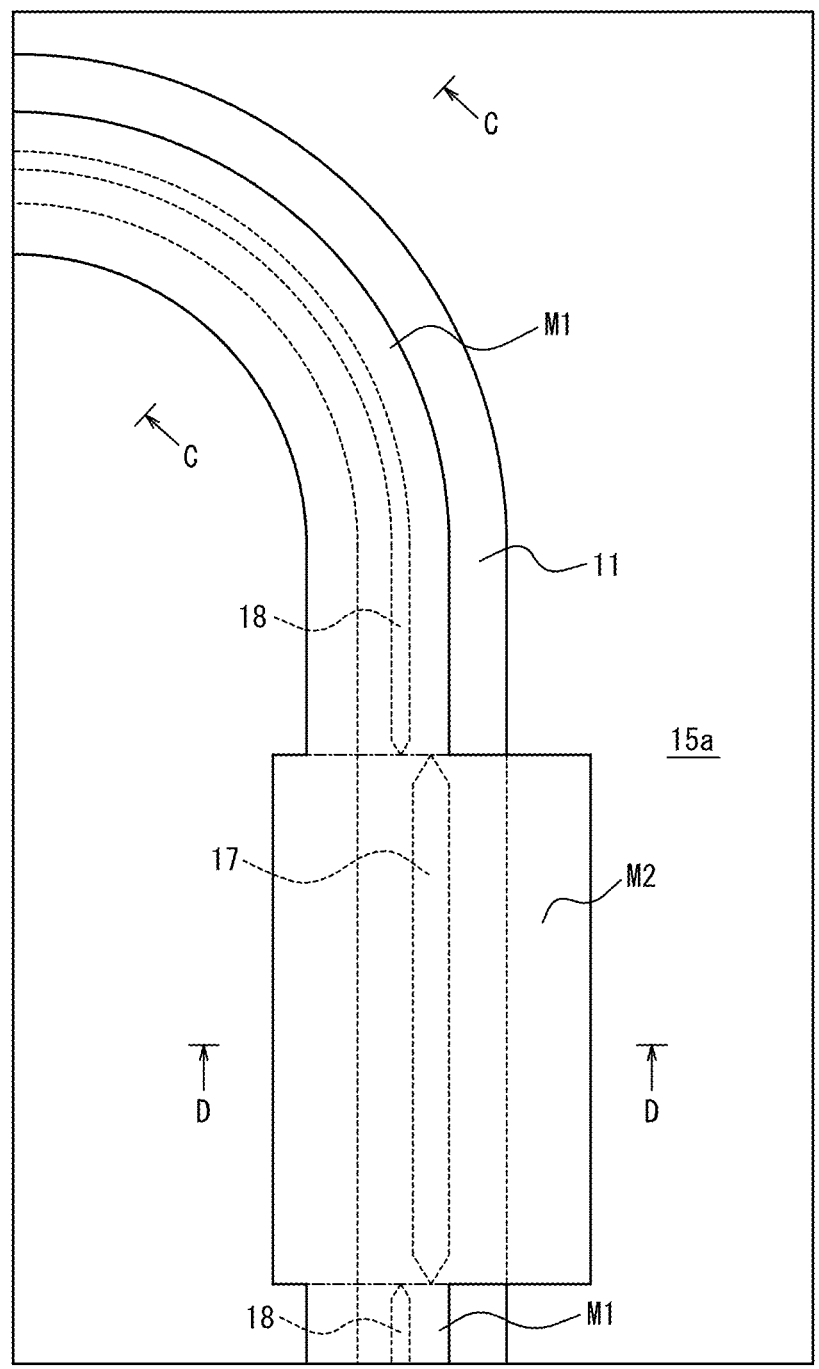
FIG. 13 is a plan view of the optical waveguide main portion in which a portion of a BOX layer is removed, for illustrating the method for manufacturing the optical waveguide according to the first embodiment of the present disclosure.
Figure 14:
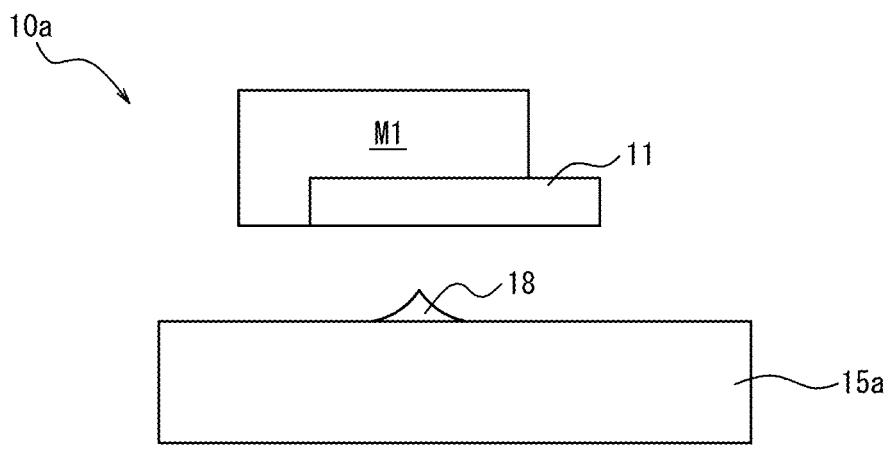
FIG. 14 is a cross-sectional end view of the optical waveguide main portion taken from line C-C in FIG. 13.
Figure 15:
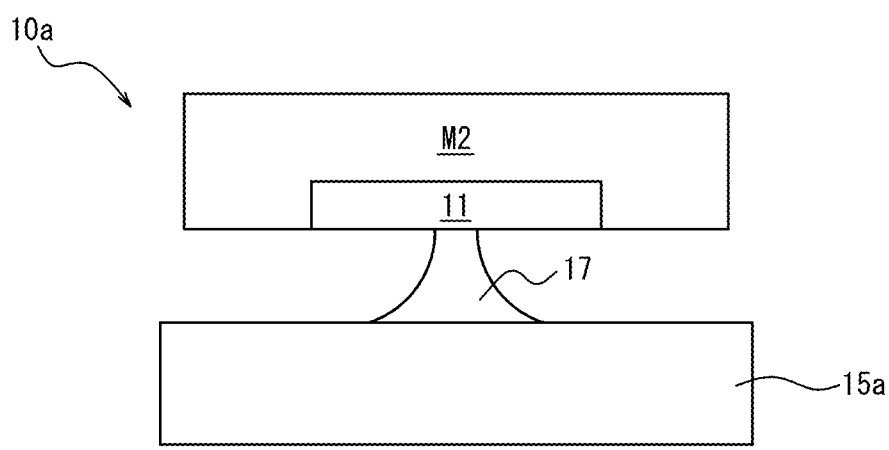
FIG. 15 is a cross-sectional end view of the optical waveguide main portion taken from line D-D in FIG. 13.
Figure 16:
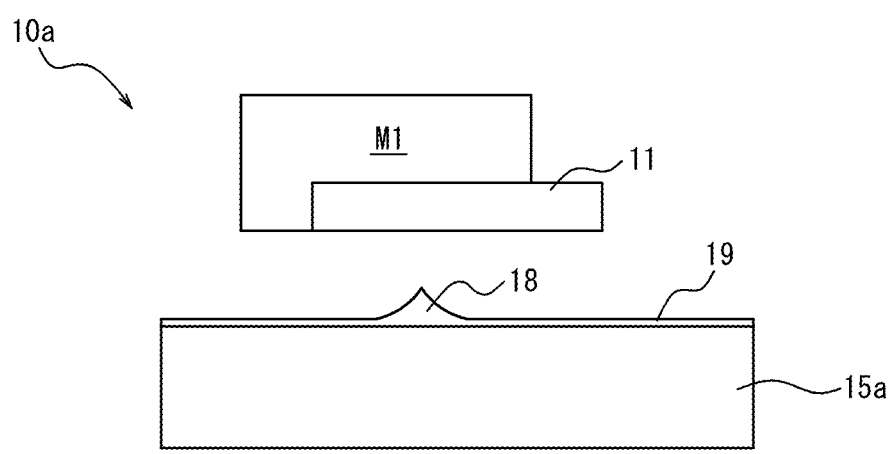
FIG. 16 is a cross-sectional end view of the optical waveguide main portion taken from the same location as line C-C in the optical waveguide main portion illustrated in FIG. 13 according to a variation of the first embodiment of the present disclosure.
Figure 17:
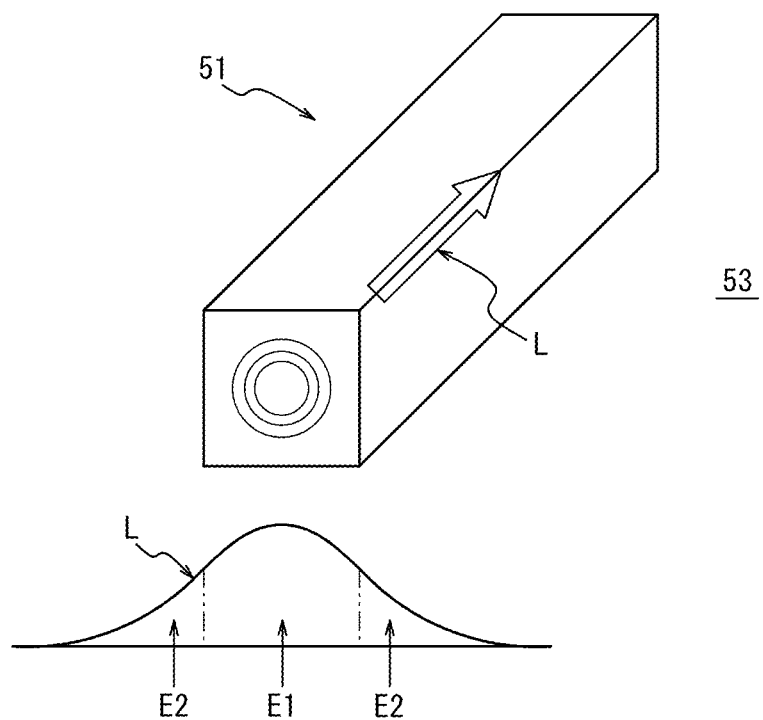
FIG. 17 is a diagram illustrating an evanescent wave of light transmitted through the optical waveguide.

Next, a method for manufacturing the optical waveguide 10 according to the present embodiment will be described with reference to FIG. 6 to FIG. 16 using FIG. 1 to FIG. 4. FIG. 6 illustrates a manufacturing process plan view of the optical waveguide 10. FIG. 7 illustrates a cross-sectional manufacturing process end view of the optical waveguide 10 taken from lines C-C and D-D in FIG. 6. FIG. 8 illustrates a manufacturing process plan view of the optical waveguide 10. FIG. 9 illustrates a cross-sectional manufacturing process end view of the optical waveguide 10 taken from lines C-C and D-D in FIG. 8. FIG. 10 illustrates a manufacturing process plan view of the optical waveguide 10. FIG. 11 illustrates a cross-sectional manufacturing process end view of the optical waveguide 10 taken from line C-C in FIG. 10. FIG. 12 illustrates a manufacturing process plan view of the optical waveguide 10 taken from line D-D in FIG. 10. FIG. 13 illustrates a manufacturing process plan view of the optical waveguide 10. FIG. 14 illustrates a cross-sectional manufacturing process end view of the optical waveguide 10 taken from line C-C in FIG. 13. FIG. 15 illustrates a cross-sectional manufacturing process end view of the optical waveguide 10 taken from line D-D in FIG. 13. FIG. 16 illustrates a cross-sectional manufacturing end view taken from the same position as the line C-C in the optical waveguide main portion 10a illustrated in FIG. 13.

First, a $SiO_2$ film is formed on one or both of a support substrate 15a that is made of silicon and eventually formed as the substrate 15, and an active substrate 11a that is made of silicon and eventually formed as the core layer 11. Next, the support substrate 15a and the active substrate 11a are stuck together with the $SiO_2$ film therebetween and subjected to heat treatment to be joined together. Then, the film thickness of the active substrate 11a is adjusted to a predetermined thickness by grinding, polishing, or the like. Thus, an SOI substrate 100 having a "silicon-insulating layer-silicon" structure that includes the support substrate 15a, a BOX layer 17a formed on the support substrate 15a, and the active substrate 11a formed on the BOX layer 17a is formed as illustrated in FIG. 6 and FIG. 7.

Next, lithography and etching are performed on the SOI substrate 100 to etch the active substrate 11a and form the core layer 11 that has a rectangular cross-section and extends in the longitudinal direction. Thus, the optical waveguide main portion 10a that includes a support substrate 15a having a plate-like shape, the BOX layer 17a having a plate-like shape and formed on the support substrate 15a, and the core layer 11 formed as a rectangular prism on a portion of the BOX layer 17a is formed as illustrated in FIG. 8 and FIG. 9.

Next, a mask pattern M1 and a mask pattern M2 that cover a portion of the core layer 11 and a portion of the BOX layer 17a, respectively, are formed as illustrated in FIG. 10 to FIG. 12. As illustrated in FIG. 10 and FIG. 11, the mask pattern M1 is arranged in a manner deviated from the central position of the core layer 11 in the width direction toward one of the peripheries. Also, in the curved portion of the core layer 11, the mask pattern M1 is disposed close to the inner periphery or the outer periphery (the inner periphery in FIG. 10 and FIG. 11). The mask pattern M2 is arranged at the central position of the core layer 11 in the width direction and wider than the mask pattern M1 as illustrated in FIG. 10 and FIG. 12. The mask pattern M1 and the mask pattern M2 may be formed from photoresist or may be hard masks such as silicon nitride films. The mask pattern M1 and the mask pattern M2 may be an integral mask layer (i.e., one mask layer) or individual mask layers.

Next, a portion of the BOX layer 17a of the optical waveguide main portion 10a is removed by performing wet etching or the like using the mask pattern M1 and the mask pattern M2 as masks. Thus, the protrusion 18 is formed in a manner deviated from the central position of the core layer 11 in the width direction toward the inner periphery or the outer periphery of the curved portion (toward the inner periphery in FIG. 13 and FIG. 14) as illustrated in FIG. 13 and FIG. 14. Also, the support 17 is formed at the central position cp of the core layer 11 in the width direction as illustrated in FIG. 13 and FIG. 15. Although a portion of the BOX layer 17a other than the portion forming the support 17 and the protrusion 18 is removed in FIG. 13 to FIG. 15, this portion of the BOX layer 17a does not need to be completely removed. As illustrated in a variation of the present embodiment referring to in FIG. 16, a thin film 19 covering the support substrate 15a may be formed from the remainder of the BOX layer 17a. At this time, the maximum height of the protrusion 18 corresponds to the height of the peak of the mountain-like shape of the protrusion 18 from a lowest position of the surface of the thin film 19 in the region immediately below the core layer 11.

Next, the mask pattern M1 and the mask pattern M2 are etched. Although the formation of the grating couplers is omitted in the present embodiment, when the grating couplers 118 and 119 as illustrated in FIG. 1 are formed, the grating couplers 118 and 119 may be formed simultaneously with, before, or after the formation of the core layer 11 illustrated in FIG. 8, followed by the formation of the mask patterns M1 and M2 illustrated in FIG. 10. The configuration illustrated in FIG. 1 is obtained by forming the grating coupler 118 in a slit-like shape at one end portion of the core layer 11 in the longitudinal direction and forming the grating coupler 119 having a slit-like shape at the other end portion of the core layer 11 in the longitudinal direction.

Then, the support substrate 15a is cut in a predetermined region to separate the optical waveguide main portion 10a. Thus, the optical waveguide 10 in which the protrusion 18 is deviated from the central position cp of the core layer 11 in the width direction is produced (see FIG. 1 to FIG. 4).

As illustrated in FIG. 1, further, the optical concentration measuring apparatus 1 is produced by installing the light source 20 in such a manner as to be able to irradiate the infrared radiation IR into the grating coupler 118 of the optical waveguide 10 and by arranging the photodetector 40 in such a manner as to be able to receive the infrared radiation IR exit from the grating coupler 119 of the optical waveguide 10.

As described above, the optical waveguide 10 has a configuration in which the protrusion 18 is deviated from the central position cp of the core layer 11 in the width direction toward one of the peripheries. Thus, the optical waveguide 10 can suppress the occurrence of sticking of the core layer 11 and prevent deterioration of detecting characteristics for detecting a substance to be measured MO caused by the protrusion 18.

According to the present embodiment, as described above, the optical waveguide 10 and the optical concentration measuring apparatus 1 that include the protrusion 18 which suppresses the occurrence of sticking of the core layer 11 and prevent deterioration of the sensitivity of the sensor can be provided.

Further, the optical waveguide 10 according to the present embodiment can reduce the amount of the evanescent wave EW absorbed by the protrusion 18. Thus, the optical waveguide 10 according to the present embodiment can detect the substance to be measured MO with high sensitivity in a stable manner in various specification modes.

Second Embodiment

Optical Waveguide

An optical waveguide according to a second embodiment of the present disclosure is an optical waveguide used in an optical concentration measuring apparatus for measuring concentration of a target gas or a target liquid to be measured. The optical waveguide includes a substrate, a core layer that extends along a longitudinal direction and is capable of transmitting light, a support that connects at least a portion of the substrate and a portion of the core layer together and supports the core layer with respect to the substrate, and protrusions that are intermittently arranged in the longitudinal direction in the space between the substrate and core layer and protruding toward the core layer from the substrate. Note that the longitudinal direction refers to a direction in which a three-dimensional structure having a shape extending along at least one direction extends the most and includes a curved direction as well as a linear direction. The core layer may include a curved portion, and a protrusion may be arranged in a space between the curved portion of the core layer and the substrate, i.e., immediately below the curved portion of the core layer. The term "immediately below" refers to "straight under", provided that a direction from the core layer to the substrate is defined as the vertical direction. The position of the maximum height of the protrusion in the width direction of the core layer may be deviated from the central position of the core layer. In the present embodiment, the term "width direction" refers to a direction that is perpendicular to the longitudinal direction of the core layer and parallel to the principle surface of the substrate. The principal surface of the substrate refers to a surface perpendicular to the thickness direction of the substrate, i.e., the largest surface in the six surfaces forming the substrate.

In the sensor employing the ATR method, the sensor sensitivity can be improved by increasing an interaction amount between the evanescent wave and the substance to be measured and reducing an amount of light absorbed by a material other than the substance to be measured. In order to reduce the amount of light absorbed by a material other than the substance to be measured, it is effective to arrange the supports for supporting the core layer in a portion of the surface of the core layer opposing the substrate in such a manner as to expose the most portion of the core layer. In a portion of the core layer that is not connected to the support and floats with respect to the substrate, sticking to the substrate may occur due to the meniscus force of water generated from condensation between the portion and the substrate. When such sticking occurs, the structure having a floating portion in a part of the waveguide cannot be maintained, and the sensitivity of the sensor is significantly deteriorated. As such, arranging an object on the surface of the substrate can reduce the occurrence of sticking. Although sticking is often regarded as a problem in devices equipped with so-called MEMS (Microelectromechanical systems) having movable parts, structures that do not include movable parts also need to prevent sticking caused by the meniscus force as described above.

As an optical waveguide having this configuration, an optical waveguide that includes a substrate, a core layer arranged on the substrate, support portions that connect the substrate and a portion of the core layer together and intermittently support the core layer with respect to the substrate, and a protrusion protruding toward the core layer from the substrate can be conceived. In the optical waveguide having such a configuration, the protrusions prevent the core layer from sticking to the substrate, thus suppressing the occurrence of the sticking. However, because the protrusion is reliably formed between the substrate and the core layer, there is a risk that the evanescent wave extending from the core layer is optically absorbed by the protrusion.

According to the optical waveguide of the present embodiment, the protrusions are intermittently arranged in the longitudinal direction of the core layer. That is, there are areas between the core layer and the substrate that do not include the protrusion in the longitudinal direction. Thus, the optical waveguide of the present embodiment can suppress the occurrence of sticking of the core layer in the areas that include the protrusions and also reduce the amount of the evanescent wave optically absorbed by the protrusions in the areas that do not include the protrusions. Thus, the optical concentration measuring apparatus that includes the optical waveguide according to the present embodiment can improve the measurement sensitivity while reducing the likelihood of failure of the optical waveguide caused by sticking and realize high sensitivity and high reliability. Also, the protrusion is arranged in a space between the curved portion of the core layer and the substrate. Thus, the optical waveguide according to the present embodiment can suppress the occurrence of sticking in the cured portion where sticking is more likely to occur than in a linear portion. Further, the position of the maximum height of the protrusion in the width direction is deviated from the central position of the core layer in the width direction. That is, a portion of the protrusion positioned closest to the core layer is deviated from the center, where the most part of the light is transmitted, of the core layer in the width direction. As described above, in the optical waveguide according to the present embodiment as described above, the protrusion has the maximum height at a position deviated from the central position of the core layer in the width direction. Thus, the amount of the evanescent wave optically absorbed by the protrusion can be further reduced, and the measuring sensitivity can be further improved. Note that, in the optical waveguide according to the present embodiment, the core layer does not need to include a movable portion.

Hereinafter, each constituent element of the optical waveguide will be described using specific examples.

Core Layer

The core layer may be any layer that extends along the longitudinal direction and is capable of transmitting light in the longitudinal direction. In particular, the core layer may be made of silicon (Si), gallium arsenide (GaAs), or germanium (Ge). The longitudinal direction refers to a longest extending direction of a three-dimensional structure having a shape extending along at least one direction and includes a curved direction as well as a linear direction. The longitudinal direction may refer to a linear direction and a curved direction. A vertical cross-section at a given position along the longitudinal direction of the core layer is not limited to have a circular shape and may have any shape, including a rectangle shape, in which the distance between the center of the cross-section and the outer surface varies when the cross-section is rotated about a central axis thereof. Accordingly, the core layer has an elongated plate-like shape in the present embodiment.

At least a portion of the core layer may be exposed to be able to come into direct contact with a target gas or a target liquid, or may be covered with a thin film thinner than ¼ of a wavelength, in vacuum, of light transmitted through the core layer and be able to come into contact with the target gas or the target liquid via the thin film. This promotes the interaction between the evanescent wave and the target gas or the target liquid and enables measurement of the concentration of the target gas or the target liquid.

Also, the core layer may include the curved portion. This enables the aspect ratio of the contour of the core layer to approach 1 when the entire core layer is viewed in plan view, and miniaturization of the optical waveguide and the optical concentration measuring apparatus. Also, at least a portion of the core layer in the longitudinal direction includes a region that does not include a support, which will be descried later, in the entire region between the core layer and the substrate in a cross-section perpendicular to the longitudinal direction. This configuration can promote the interaction between the evanescent wave extending from the core layer and the gas or the liquid surrounding the optical waveguide. Note that "area that does not include the support" refers to a state in which the core layer forms a bridge between two supports adjacent to each other in the longitudinal direction. Further, "area that does not include the support" refers to a state in which the entire region, opposing the substrate, of the core layer has a gap or a medium, having lower absorptivity with respect to the light transmitted through the core layer than the support between the substrate and the entire region, between two supports adjacent to each other in the longitudinal direction.

The light transmitted through the core layer may be infrared radiation serving as an analog signal. Here, the infrared radiation serving as the analog signal is not for determination on an energy change of light between zero (low level) and 1 (high level), and represents a signal for an amount of the energy change of light. Thus, the optical waveguide according to each embodiment can be used for sensors and analysis equipment. In this case, the wavelength, in vacuum, of the infrared radiation may be 2 µm to 12 µm. This is the wavelength band absorbed by gasses ($CO_2$, $CO$, $NO$, $N_2O$, $SO_2$, $CH_4$, $H_2O$, $C_2H_6O$, and the like)

that are typically floating in the environment. Accordingly, the optical waveguide according to each embodiment can be used as a gas sensor.

Substrate

The substrate may be any substrate on which the support, the protrusion, and the core layer can be formed. In particular, the substrate may be a silicon substrate or a GaAs substrate. The principal surface of the substrate refers to the surface of the substrate extending in a horizontal direction (a direction perpendicular to the film thickness direction). The surface of the substrate does not need to be exposed and may be partially covered with a thin film made of the same material as the support and the protrusion. When the surface of the substrate is not exposed, the height of the protrusion described later refers to the height of the surface of the protrusion from the lowest position of the thin film surface in the region immediately below the core layer, rather than the height of the surface of the protrusion from the surface of the substrate.

Support

The support connects at least a portion of the substrate and a portion of the core layer together. The support supports the core layer with respect to the substrate.

The support may be any support capable of connecting the substrate and the core layer together and is preferably made of a material that has a smaller refractive index than the core layer with respect to light of any wavelength or light transmitted through the core layer. The material of the support may be, for example, silicon oxide film ($SiO_2$), silicon (Si), gallium arsenide (GaAs), or the like. The index of refraction is the index of refraction with respect to light of any wavelength or light of a particular wavelength. The light of a particular wavelength is, in particular, the light transmitted through the core layer of the optical concentration measuring apparatus. In this way, the support can reflect the entire light transmitted through the core layer at the connecting portion connected to the core layer.

The connecting portion between the support and the core layer may be positioned at any apposition on the surface, opposing the substrate, of the core layer including, for example, a central portion in the width direction. Also, the connecting portion between the support and the core layer may be at any position on the end surface of the core layer in the width direction. Also, the connecting portion between the support and the core layer may be intermittently arranged along the longitudinal direction of the core layer. This configuration enlarges the outer surface that does not contact the support in a portion of the core layer in the longitudinal direction, and thus can enlarge an interaction area between the evanescent wave and the target gas or the target liquid. Further, the connecting portion between the support and the core layer may have a shape extending in the longitudinal direction of the core layer as it is positioned closer to the central position of the core layer away from the edge portion of the core layer in the width direction. By virtue of this shape, the surrounding conditions of the core layer gradually change along the longitudinal direction of the core layer from an area that does not include the support to an area that includes the support (or vice versa). Thus, a sudden change of the surrounding conditions for the light transmitted through the core layer can be avoided, and a scattering loss of the light transmitted through the core layer can be reduced.

A method for forming the support is, for example, etching a BOX (Buried Oxide) layer in the SOI (Silicon On Insulator) substrate, whereby a structure in which the core layer (Si layer) is supported by the BOX layer with respect to the substrate (Si layer) can be formed.

Protrusion

The protrusions are intermittently arranged in the longitudinal direction of the core layer in the space between the substrate and the core layer. The protrusions protrude toward the core layer from the substrate.

The protrusions may be formed from the same material as the support. This facilitates the formation of the protrusions arranged in an area overlapping with the support in the thickness direction of the core layer by employing the lithography technology and the etching technology. Also, the protrusions may have a mountain-like shape. Thus, in a configuration in which the core layer has, for example, a rectangular shape in a plane perpendicular to the longitudinal direction, the bottom surface of the core layer and the surface of the protrusions having the mountain-like shape are not in parallel with each other, and sticking between the core layer and the protrusion is unlikely to occur. When the protrusions do not have a mountain-like shape, a similar effect can be obtained by virtue of that the bottom surface of the core layer and the surface of the protrusions opposing the core layer are not in parallel with each other. Note that the mountain-like shape of the protrusions is shapes of the protrusions viewed from any direction perpendicular to the thickness direction of the core layer, e.g., the longitudinal direction of the core layer. Although each of the protrusions may have an asymmetrical shape in the width direction of the core layer, each of the protrusions preferably has a symmetrical shape. The symmetrical shape in the width direction of the core layer means a line-symmetrical shape with a straight line perpendicular to the width direction serving as the axis of symmetry. Thus, in a configuration in which the core layer has a symmetrical shape in the width direction and each of the protrusions also has a symmetrical shape in the width direction, when light transmits to the core layer in an area that includes the protrusion immediately below the core layer from the care layer in an area that does not include the protrusion immediately below the core layer, mode conversion of light is suppressed, and transmission loss due to the mode conversion is reduced. The maximum height of the protrusion may be ¹⁄₂₀ or more of the distance between the core layer and the substrate. This configuration can suppress the occurrence of sticking of the core layer. The maximum height of the protrusion may be 100 nm or more. This configuration can further suppress the occurrence of sticking of the core layer. Also, in the longitudinal direction of the core layer, a given protrusion may include, therearound, an area that does not include the protrusion and the support, that is, an area between two protrusions adjacent to each other in the longitudinal direction or an area between the protrusion and the support adjacent to each other in the longitudinal direction. A longitudinal length of the area that does not include the protrusion and the support may be equal to or smaller than:

$$\frac{1}{2}\left(\frac{Eh^2t^3}{\alpha}\right)^{\frac{1}{4}}.$$ [Formula 1]

Here, E is a Young's modulus [N/m²] of the core layer, h is a floating distance [m] between the core layer and substrate, t is a thickness [m] of core layer, and α is an experimental proportional parameter 45.2345×10⁻⁶ [N/m]. Also, the longitudinal length of the area that does not include the protrusion and the support may be 71 μm or less. In this way, the area of the core layer in the longitudinal direction that does not include the support and the protrusion can be equal to or smaller than:

$$\frac{1}{2}\left(\frac{Eh^2t^3}{\alpha}\right)^{\frac{1}{4}},$$ [Formula 2]

or 71 μm or less, whereby the occurrence of sticking in the optical waveguide can be suppressed. Further, a position of the maximum height of the protrusion may be deviated from the central position of the core layer in the width direction. However, the protrusion does not need to have the maximum height at a position deviated from the central position of the core layer in the width direction over the entire region of the core layer in the longitudinal direction. For example, the protrusion may have the maximum height at a position deviated from the central position of the core layer in the width direction in at least an area of the core layer in the longitudinal direction and have a maximum height at the central position of the core layer in the width direction in another area.

Optical Concentration Measuring Apparatus

An optical concentration measuring apparatus according to the present embodiment includes the optical waveguide according to the present embodiment, a light source capable of irradiating light into the core layer, and a detector capable of detecting light transmitted through the core layer.

Each constituent element of the optical concentration measuring apparatus will be described below with specific examples.

Light Source

The light source may be any light source capable of irradiating light into the core layer. When infrared radiation is used for the measurement of a gas, an incandescent bulb, a ceramic heater, a MEMS (Microelectromechanical systems) heater, an infrared LED (Light-Emitting Diode), or the like can be used as the light source. The light source may be arranged in any manner that can be optically connected to the optical waveguide. For example, the light source may be arranged adjacent to the optical waveguide in the same constituent element, or may be arranged at a certain distance from the optical waveguide as a different constituent element. When ultraviolet rays are used for the measurement of a gas, a mercury lamp, an ultraviolet LED, or the like can be used as the light source. When x-rays are used for the measurement of a gas, an electron beam, an electron laser, or the like can be used as the light source.

The light transmitted through the core layer of the optical waveguide provided in the optical concentration measuring apparatus may be infrared radiation serving as an analog signal. Here, the infrared radiation serving as the analog signal is not for determination on an energy change of light between zero (low level) and 1 (high level), and represents a signal for an amount of the energy change of light. Thus, the optical concentration measuring apparatus can be used for sensors and analysis equipment. In this case, the wavelength, in vacuum, of the infrared radiation may be 2 μm to 12 μm. This is the wavelength band absorbed by gasses ($CO_2$, CO, NO, $N_2O$, $SO_2$, $CH_4$, $H_2O$, $C_2H_6O$, and the like) that are typically floating in the environment. Accordingly, the optical concentration measuring apparatus according to the present embodiment can be used as a gas sensor.

Detector

The detector may be any detector capable of receiving light transmitted through the core layer of the optical waveguide. When infrared radiation is used for the measurement of a gas, a thermal infrared sensor such as a pyroelectric sensor, a thermopile, or a bolometer, or a quantum infrared sensor such as a diode or a phototransistor may be used as the detector. When ultraviolet rays are used for the measurement of a gas, a quantum ultraviolet sensor such as a diode or a phototransistor may be used as the detector. When x-rays are used for the measurement of a gas, various types of a semiconductor sensor may be used as the detector.

The optical waveguide and an optical concentration measuring apparatus according to the present embodiment will be described with reference to FIG. 20 to FIG. 36.

Figure 20:
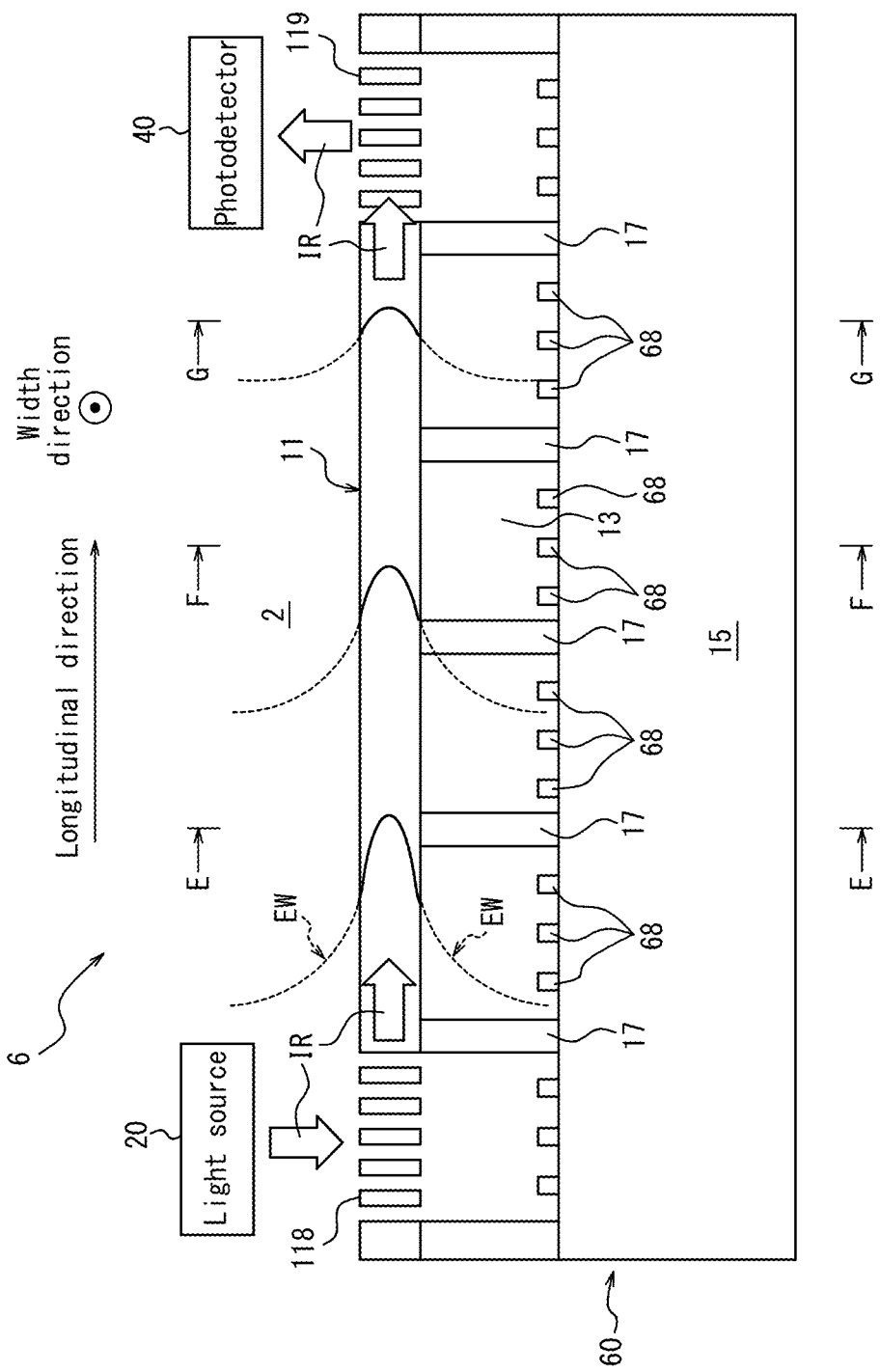
FIG. 20 is a diagram illustrating a schematic configuration of an optical waveguide and an optical concentration measuring apparatus 1 according to a second embodiment of the present embodiment, for illustrating sensing employing ATR method using the optical concentration measuring apparatus.

FIG. 20 is a diagram illustrating a schematic configuration of an optical concentration measuring apparatus 6 according to the present embodiment and is also a conceptual drawing of the ATR method using the optical waveguide 10 according to the present embodiment.

As illustrated in FIG. 1, the optical concentration measuring apparatus 6 is installed and used in the external space 2 that includes a gas whose concentration or the like is to be detected. The optical concentration measuring apparatus 6 includes an optical waveguide 60 according to the present embodiment, a light source 20 capable of irradiating light (infrared radiation IR in the present embodiment) into a core layer 11 provided in the optical waveguide 60, and a photodetector (an example of a detector) 40 capable of receiving the infrared radiation IR transmitted through the core layer 11.

The optical waveguide 60 includes a substrate 15, the core layer 11 that can transmit the infrared radiation IR (an example light), supports 17 each of which intermittently connects at least a portion of the substrate 15 and a portion of the core layer 11 together and thus supports the core layer 11 with respect to the substrate 15, and protrusions 68 that protrude toward the core layer 11 from the substrate 15. The core layer 11 and the substrate 15 are made of silicon (Si), and the supports 17 and the protrusions 18 are made of silicon dioxide ($SiO_2$).

Figure 21:
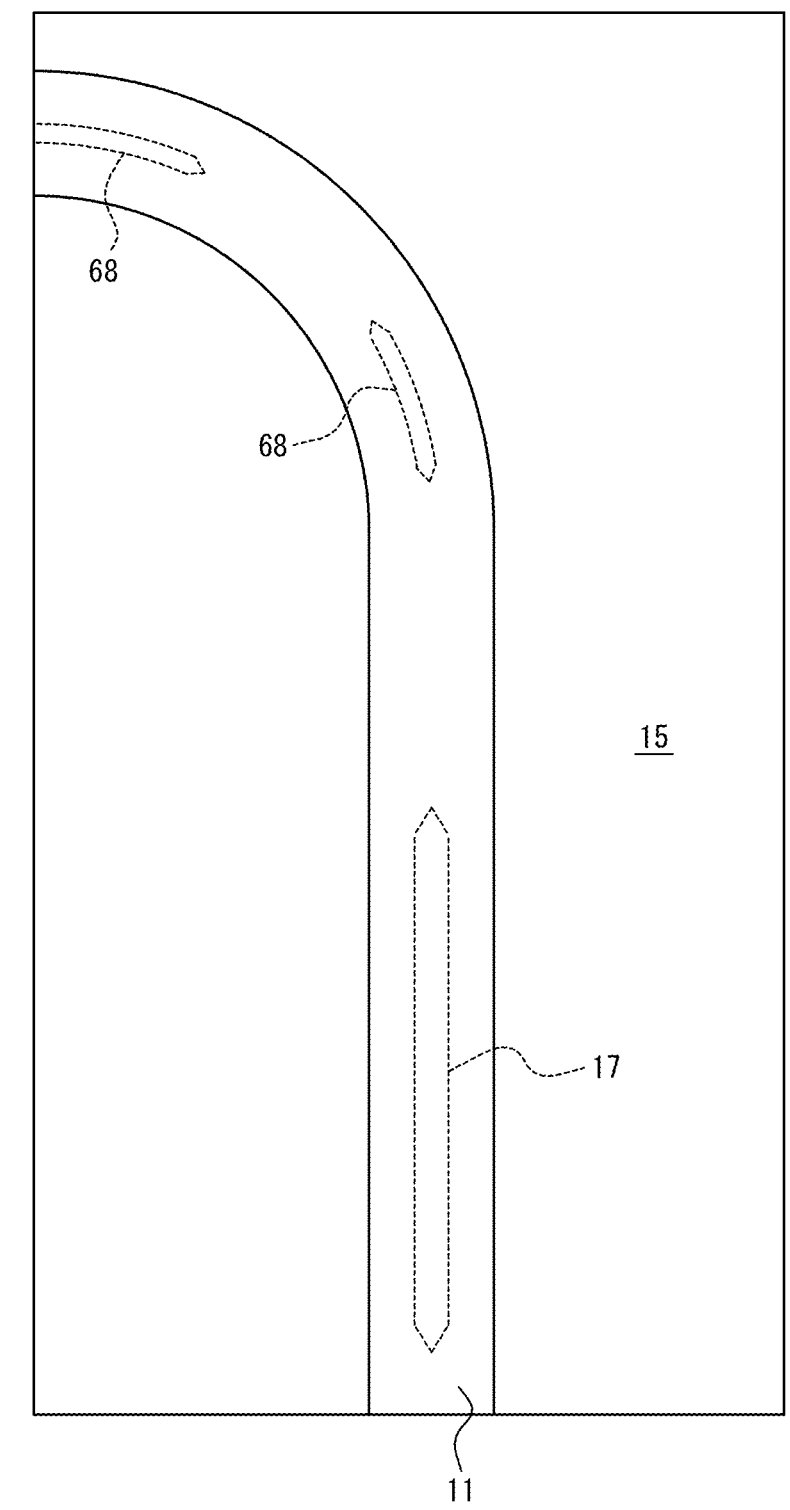
FIG. 21 is a plan view illustrating a configuration of a portion of the optical waveguide according to the second embodiment of the present disclosure, viewing a portion of the optical waveguide from a light source side or a photodetector side with respect to a principal surface of a substrate.

The substrate 15 has, for example, a plate-like shape. The core layer 11 is, for example, a rectangular parallelepiped in part. The core layer 11 includes a curved portion in which the rectangular parallelepiped is curved about an axis in a direction perpendicular to the principle surface of the substrate 15, as illustrated in FIG. 21.

As illustrated in FIG. 20, the optical waveguide 60 includes a grating coupler 118 formed at one end of the core layer 11 in the longitudinal direction and a grating coupler 119 formed at the other end of the core layer 11 in the longitudinal direction. The grating coupler 118 is arranged in the irradiating direction of the light source 20. In the present embodiment, the optical waveguide 60 is arranged such that the stacking direction therein is parallel to the vertical direction, and the principle surface of the substrate 15 is directed in the vertically downward direction. The irradiating direction of the light source 20 is vertically downward from the light source 20 in a state in which the optical waveguide 10 is installed in the above manner. The grating coupler 118 couples the infrared radiation IR irradiated by the light source 20 with the infrared radiation IR transmitted through the core layer 11. The grating coupler 119 is arranged in a direction facing the photodetector 40. Note that "the direction facing the photodetector 40" is a direction vertically downward from the photodetector 40 in a state in which the optical waveguide 10 is installed in the above manner. The grating coupler 119 is configured to extract the infrared radiation IR transmitted through the core layer 11 and pass the extracted infrared radiation IR to the photodetector 40.

Figure 22:
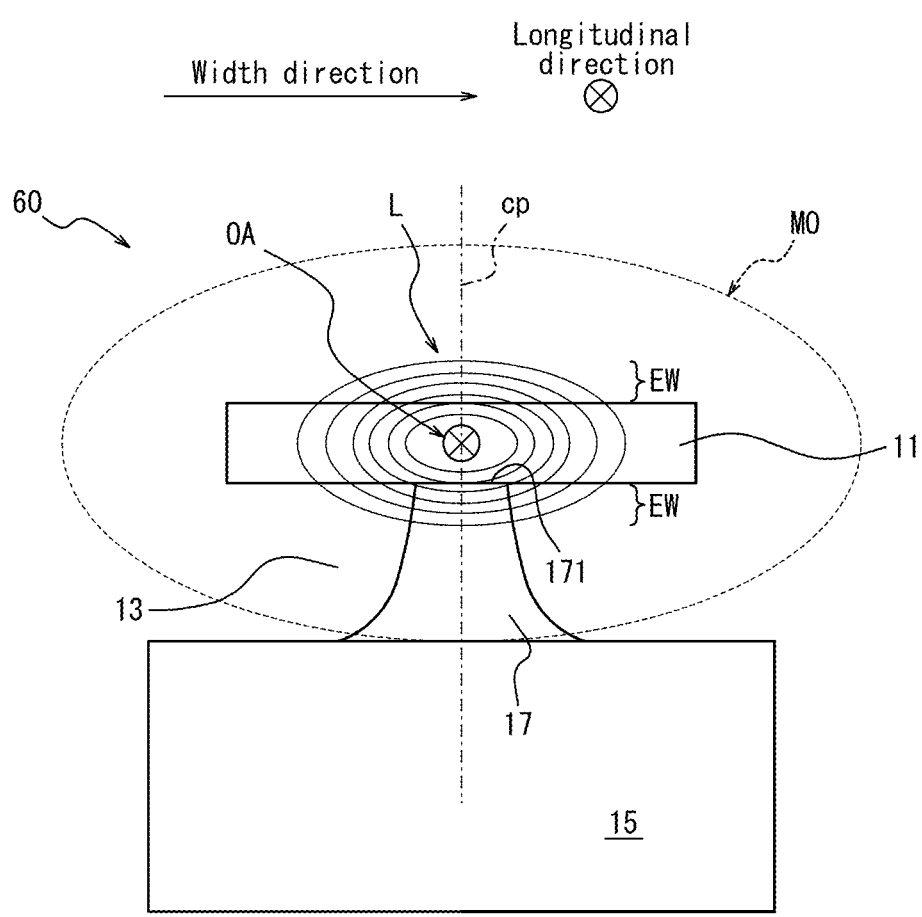
FIG. 22 is a cross-sectional end view of the optical waveguide taken from line E-E in FIG. 20, for illustrating a schematic configuration of the optical waveguide according to the second embodiment of the present disclosure.
Figure 23:
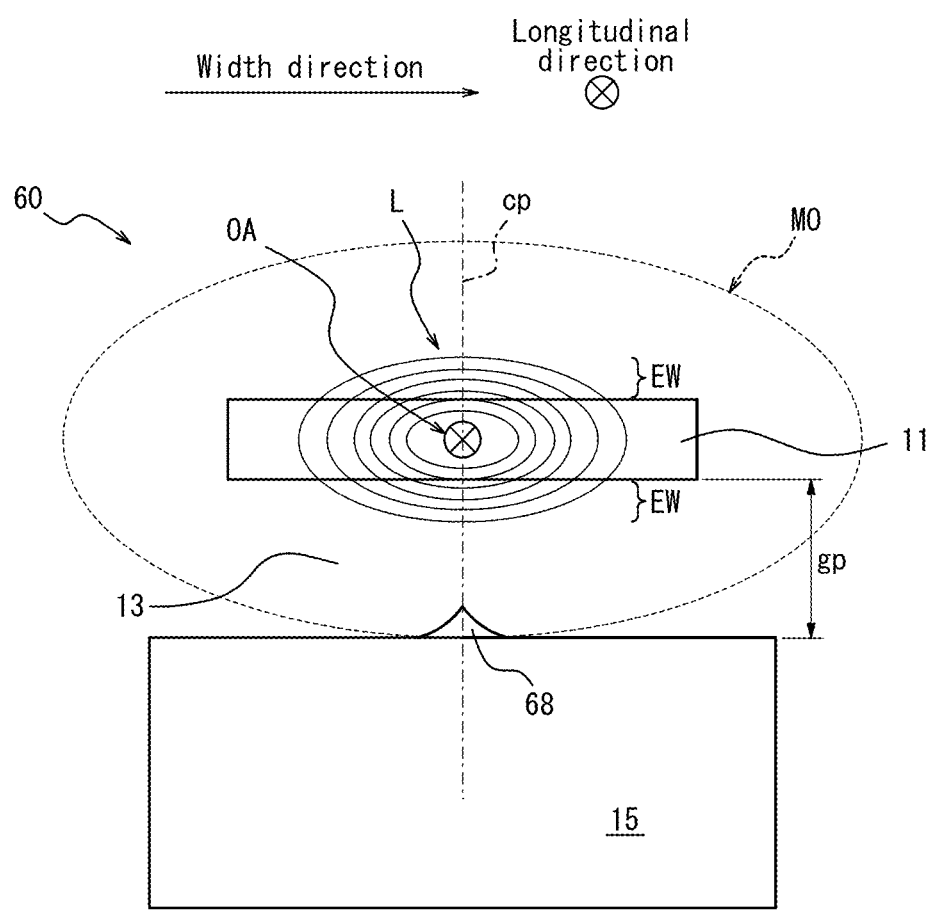
FIG. 23 is a cross-sectional end view of the optical waveguide taken from line F-F in FIG. 20, for illustrating the schematic configuration of the optical waveguide according to the second embodiment of the present disclosure.
Figure 24:
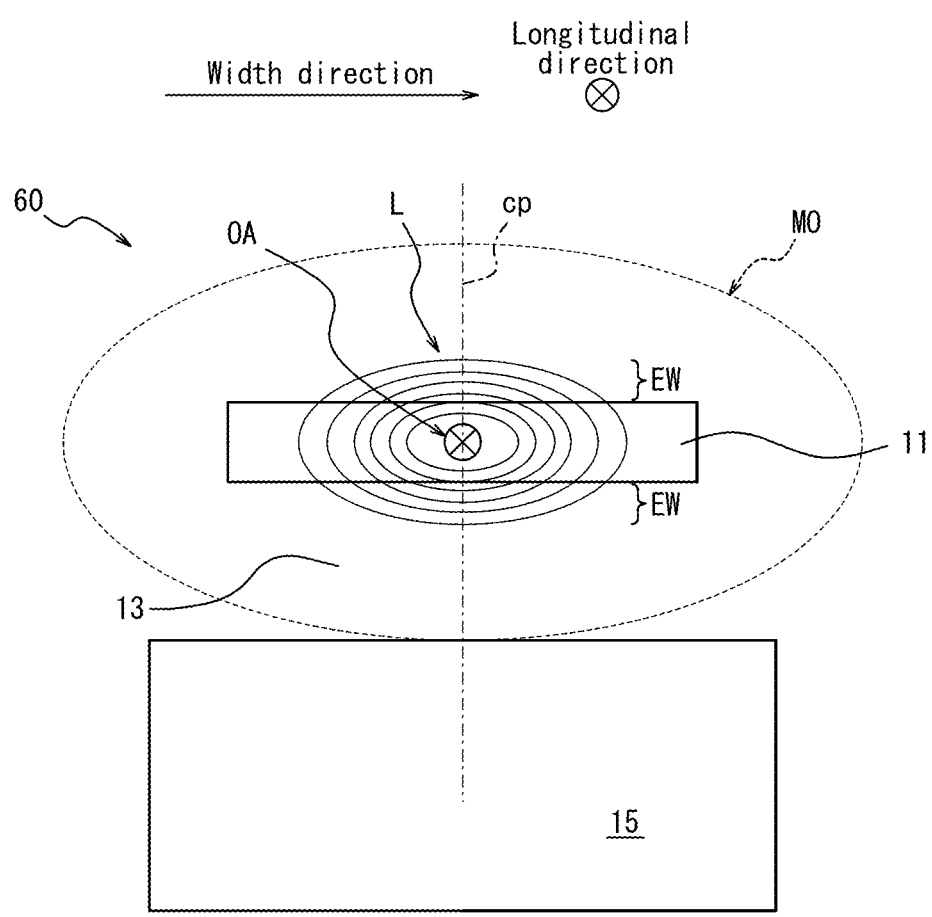
FIG. 24 is a cross-sectional end view of the optical waveguide taken from line G-G in FIG. 20, for illustrating the schematic configuration of the optical waveguide according to the second embodiment of the present disclosure.

FIG. 22 is a cross-sectional end view of the optical waveguide 60 taken from line E-E in FIG. 20, and FIG. 23 is a cross-sectional end view of the optical waveguide 60 taken from line F-F in FIG. 20. FIG. 24 is a cross-sectional end view of the optical waveguide 60 taken from line G-G in FIG. 20.

As illustrated in FIG. 20, FIG. 22, FIG. 23, and FIG. 24, the optical waveguide 60 includes gaps 13 between the core layer 11 and the substrate 15 without having a predetermined layer such as a clad layer, except for the areas that include the supports 17.

As illustrated in FIG. 22, a connecting portion 171 of the support 17 connected to the core layer 11 overlaps with the central position cp of the core layer 11 in the width direction. As illustrated in FIG. 20, also, the connecting portions 171 of the supports 17 are intermittently arranged along the longitudinal direction. As illustrated in FIG. 20 and FIG. 21, further, the protrusions 68 are intermittently arranged in the space between the substrate 15 and the core layer 11 in the longitudinal direction of the core layer 11.

In the space, the protrusions 68 are arranged at positions different from the positions of the supports 17 in the longitudinal direction of the core layer 11. As illustrated in FIG. 23, the protrusion 68 is arranged at a position overlapping with the central position cp of the core layer 11 in the width direction in the space. The protrusion 68 has a mountain-like shape as viewed from the longitudinal direction of the core layer 11. The protrusion 68 has a symmetrical shape in the width direction of the core layer 11. A maximum height of the protrusion 68 is 1/20 or more of the gap gp between the core layer 11 and the substrate 15, which is 100 nm or more, in particular. The protrusion 68 is also arranged immediately below the curved portion of the core layer 11 as illustrated in FIG. 21. In the longitudinal direction of the core layer 11, a length of an area that does not include the support 17 and the protrusion 68 in the longitudinal direction of the core layer 11, that is, an area between two protrusions 68 adjacent to each other in the longitudinal direction of the core layer 11 or an area between a protrusion 68 and a support 17 adjacent to each other in the longitudinal direction of the core layer 11 is equal to or smaller than:

$$\frac{1}{2}\left(\frac{Eh^2 t^3}{\alpha}\right)^{\frac{1}{4}},$$ [Formula 3]

which is equal to or smaller than 71 μm, in particular. Here, E is the Young's modulus [N/m²] of the core layer, h is the gap gp [m] between the core layer 11 and substrate 15, t is the thickness [m] of core layer 11, and α is the experimental proportional parameter 45.2345×10⁻⁶ [N/m].

The shape of the protrusion 68 and the positions of the protrusions 68 with respect to the width direction of the core layer 11 can be observed in the following manner. To observe a cross-sectional shape of the protrusion 68, a SEM (scanning electron microscope) is used to observe a plane perpendicular to the longitudinal direction. To observe a relative position between the protrusion 68 and the core layer 11 with respect to the width direction, a damaged layer is formed by emitting an FIB (Focused Ion Beam) from a side of the core layer 11 of the optical waveguide 60 such that a shadow of the core layer 11 is transferred onto the substrate. Then, the core layer 11 is peeled off, and the shadow, transferred onto the peeled surface, of the core layer 11 and the protrusion 68 are observed using the SEM. In particular, the FIB is emitted in the direction perpendicular to the principle surface of the substrate 15 at a portion where the core layer 11 is floating. Thus, the shadow of the core layer 11 is transferred onto the substrate 15 by the damaged layer generated by the FIB. The transferred shadow of the core layer 11 indicates the position of the core layer 11 in a plane parallel to the principle surface of the substrate 15. Thus, by comparing the transferred shadow of the core layer 11 and the position of the protrusion 68, the relative position between the protrusion 68 and the core layer 11 can be determined.

Here, an effect of the optical waveguide 60 according to the present embodiment will be described by comparing with an optical waveguide 60' that includes a protrusion 18' arranged over the entire region in the longitudinal direction, as illustrated in FIG. 37.

A sensor that employs the ATR method is often set to transmit light in a single mode within the core layer. In the optical concentration measuring apparatus 6 according to the present embodiment, light (infrared radiation) is transmitted in single-mode by way of example within the core layer 11 of the optical waveguide 60. Note that, when light is transmitted in a multi-mode, the light is transmitted in the longitudinal direction of the core layer, whereby the effect of the present disclosure can be obtained. As illustrated in FIG. 20, when infrared radiation IR is transmitted in the single mode within the core layer 11, the intensity of the infrared radiation decreases with a distance from the central portion of the core layer 11, and an evanescent wave EW extends from the vicinity of the core layer 11. Note that the evanescent wave EW of the infrared radiation IR transmitted through the core layer 11' of the optical waveguide 60', in which the protrusions 68' are arranged over the entire region in the longitudinal direction between the supports 17' adjacent to each other as illustrated in FIG. 37, has the same distribution as that of the optical waveguide 60 of the present embodiment.

In a sensor that employs the ATR method, the sensitivity of the sensor is improved by expanding the region of interaction between the evanescent wave extending from the core layer and a substance to be measured (that is, by increasing an exposed portion of the core layer) and suppressing optical absorption by materials other than the substance to be measured (that is, absorption of light by the support or the like). Arranging the protrusions 68' over the entire region in the longitudinal direction between the supports 17' adjacent to each other as illustrated in FIG. 37 for the purpose of suppressing occurrence of sticking can be considered as the simplest configuration.

However, in the optical waveguide 60', the evanescent wave EW is absorbed by the material forming the protrusion 68' over the entire region in the longitudinal direction in the gap 13 between the core layer 11' and the substrate 15'. As a result, the sensitivity of the sensor using the optical waveguide 60' is deteriorated.

As illustrated in FIG. 20, the optical waveguide 60 according to the present embodiment has a structure for suppressing sticking caused by the protrusions 68 disposed in the gap between the core layer 11 and the substrate 15, in a manner similar to the optical waveguide 60'. As illustrated in FIG. 20, however, the protrusions 68 are intermittently arranged in the longitudinal direction of the core layer 11. Thus, the evanescent wave EW extending from the core layer 11 to its periphery is not absorbed in the areas that do not include the protrusions 68, whereby the amount of light (infrared radiation) absorbed by the protrusions 68 while transmitting from the grating coupler 118 to the grating coupler 119 is reduced. In this way, the optical waveguide 60 according to the present embodiment can reduce the optical absorption of the evanescent wave EW by the protrusions 68, as compared to the optical waveguide 60' in which the protrusions 68' are continuously arranged in the longitudinal direction of the core layer 11' in an ordinary manner.

Each of the protrusions 68 has a mountain-like shape as viewed from the longitudinal direction of the core layer 11. Thus, in a configuration of the present embodiment in which the core layer 11 has a rectangular shape within the plane perpendicular to the longitudinal direction, the bottom surface of the core layer 11 and the surfaces of the protrusions 68 do not become parallel with each other, whereby sticking between the core layer and the protrusions is unlikely to occur. Also, each of the protrusions 68 has a symmetrical shape in the width direction of the core layer 11. Thus, in the present embodiment in which the core layer 11 has a symmetrical shape in the width direction, by virtue of the symmetrical shape of the protrusions 68 in the width direction, mode conversion of the light is unlikely to occur while the light transmits from a core layer in an area that does not include a protrusion 68 immediately below the core layer to a core layer in an area that includes a protrusion 68 immediately below the core layer 11, and transmission loss due to the mode conversion is reduced. The maximum height of the protrusion 68 is 1/20 or more of the gap gp between the core layer 11 and the substrate 15, which is 100 nm or more, in particular. This configuration can further suppress the occurrence of sticking of the core layer 11. Also, for the purpose of miniaturization of the optical waveguide 60 in its entirety, the core layer 11 includes the curved portion, immediately under which the protrusion 68 is arranged. Thus, the optical waveguide 60 can improve the durability against sticking of the curved portion of the core layer 11 where the durability is otherwise lower than that of the linear portion. In the longitudinal direction of the core layer 11, the length of the area that does not include the support 17 and the protrusion 68 is equal to or smaller than:

$$\frac{1}{2}\left(\frac{Eh^2t^3}{\alpha}\right)^{\frac{1}{4}}, \qquad \text{[Formula 4]}$$

or 71 μm or more, in particular.

Here, E is a Young's modulus [N/m²] of the core layer, h is the gap gp [m] between the core layer 11 and substrate 15, t is the thickness [m] of core layer 11, and α is the experimental proportional parameter 45.2345×10⁻⁶ [N/m]. In this way, the area in the longitudinal direction of the core layer 11 that does not include the support 17 and the protrusion 68 can be regulated to be equal to or smaller than:

$$\frac{1}{2}\left(\frac{Eh^2t^3}{\alpha}\right)^{\frac{1}{4}}, \qquad \text{[Formula 5]}$$

or 71 μm or less, whereby the occurrence of sticking in the optical waveguide 60 can be suppressed.

Here, in the longitudinal direction of the core layer 11 of the optical waveguide 60 according to the present embodiment, the area in the longitudinal direction of the core layer 11 that does not include the support 17 and the protrusion 68 will be described in more detail.

In the present disclosure, the protrusions 68 are intermittently arranged in the longitudinal direction below the core layer 11. Such an intermittent arrangement of the protrusions 68 corresponds to the configuration of the optical waveguide 60 that has the configuration in which the core layer 11 having a floating structure with respect to the substrate 15 includes an area in which a given protrusion 68 does not have another protrusion 68 or the support 17 provided therearound. Here, such an area in which a given protrusion 68 does not include another protrusion 68 or the support 17 therearound may be classified into the following two types:

I: Area from a given protrusion 68 to the next protrusion 68

II: Area from a given protrusion 68 to a support 17.

Here, because the support 17 more effectively suppress sticking than the protrusion 68, a distance of II can be longer than a distance of I. Thus, in the optical waveguide 60 that includes the protrusions 68 intermittently arranged, a maximum value of the distance which can prevent sticking without a protrusion 68 can be estimated from the distance II. That is, in the optical waveguide 60 having the configuration in which the core layer 11 is supported by two supports 17 and floats with respect to the substrate 15, by examining the distance between the two supports 17 with respect to a region in which sticking occurs in a state in which a protrusion 68 is not provided between the two supports 17, a maximum distance around the protrusion 68 that can suppress sticking without another protrusion 68 or a support 17 can be estimated.

FIG. 38 is a microscopy image (a plan view) of the optical waveguide 60 observed when the optical waveguide 60 was produced without forming the protrusion 68 below the core layer 11, the core layer 11 (silicon) having the thickness of 220 nm, the width of 2 μm and the floating distance between the core layer 11 and the substrate 15 (i.e., the height of the support 17 from the surface of the substrate 15) of 3 μm, and the distance between supports 17 being 150 μm. In FIG. 38, the core layer 11 is in contact with the substrate 15 due to sticking around the central portion of the core layer 11, ranging 45 μm, in the distance of 150 μm between the supports 17 (while the remainder of the core layer 11 is floating). As illustrated in FIG. 38, in the rhombus-shaped areas of the core layer 11 on the left and right sides, the support 17 is provided between the core layer 11 and the substrate 15, and the narrow area of the core layer 11 between the rhombus-shaped areas include neither the support 17 nor the protrusion 68. From this measurement result, the maximum distance $1p$ between the protrusion 68 and the support 17 capable of suppressing sticking can be determined as an equation (1):

[Formula 6]

$$l_p = \frac{1}{2}\left(\frac{Eh^2t^3}{\alpha}\right)^{\frac{1}{4}}. \qquad (1)$$

Here, E is Young's modulus [N/m²] of a beam (i.e., core layer 11), h is the gap gp [m] between the core layer 11 and substrate 15, t is a thickness [m] of the beam (the core layer 11), and α is the experimental proportional parameter 45.2345×10⁻⁶ [N/m].

In order to obtain the equation (1), the optical waveguide 60 described above is assumed as a beam which is rectangular shape in cross-section and is fixed at both ends of it, and a model in which the Laplace pressure caused by the surface tension of chemical solution accumulated between the core layer 11 and the substrate 15 during the manufacturing process is a uniform load is applied, then a deflection amount is calculated using equations (2), (3) and (4).

[Formula 7]

$$v(x) = \frac{pl^2 x^2}{24EI}\left(1 - \frac{2x}{l} + \frac{x^2}{l^2}\right) \quad (2)$$

$$I = \frac{wt^3}{12} \quad (3)$$

$$p = \frac{2\gamma w \cos\theta}{h} \quad (4)$$

In the equations (2) to (4), v(x) is the deflection amount at a distance x from one end, p is a load per unit length, l is a total length of the beam (i.e., the floating portion of the core layer 11), I is the geometrical moment of inertia, w is a width of the beam, γ is the surface tension, and θ is a contact angle. In the optical waveguide 60 having the size described above with reference to FIG. 38 (i.e., the thickness of the core layer 11 is 220 nm, the width of the core layer 11 is 2 μm, the floating distance between the core layer 11 and the substrate 15 is 3 μm, and the distance between supports is 150 μm), when the Young's modulus of the core layer 11 corresponds to the Young's modulus of single crystal silicon (193 GPa), the load p can be determined such that the length of the x region in which the deflection amount takes a value larger than the floating distance h (i.e., 3 μm), which means the distance in a state contacting the substrate 15, becomes 45 μm.

On the other hand, because the maximum deflection amount $v_{max}$ corresponds to the deflection at the central portion of the beam (i.e., x=½), $v_{max}$ can be calculated as equations (5) and (6) by using the equations (2), (3) and (4).

[Formula 8]

$$v_{max} \propto \frac{l^4}{Eht^3} \quad (5)$$

$$\therefore v_{max} = \alpha \frac{l^4}{Eht^3} \quad (6)$$

At this time, the experimental proportional parameter α can be obtained by using the load p calculated from the measuring result.

Incidentally, the protrusion 68 can suppress sticking when provided at a contact position between the core layer 11 and the substrate 15. Thus, when the protrusion 68 is positioned at a position half the entire length of the floating portion of the core layer 11 in a condition that the core layer 11 contacts the substrate 15 at just one point (i.e., when the maximum deflection amount $v_{max}$ and the floating distance h between the core layer 11 and the substrate 15 are equal to each other), sticking can be suppressed. From this condition, $l_p$ can be calculated as equation (9), via equations (7), (8).

[Formula 9]

$$v_{max} = \alpha \frac{l^4}{Eht^3} = h \quad (7)$$

$$l = \left(\frac{Eh^2 t^3}{\alpha}\right)^{\frac{1}{4}} \quad (8)$$

$$\therefore l_p = \frac{1}{2}\left(\frac{Eh^2 t^3}{\alpha}\right)^{\frac{1}{4}} \quad (9)$$

From the equation (9), in particular, in a configuration in which the optical waveguide 60 having the core layer 11 made of silicon has the cross-sectional dimensions described with reference to FIG. 38 (i.e., the thickness of the core layer 11 is 220 nm and the floating distance between the core layer 11 and the substrate 15 is 3 μm), sticking can be suppressed by arranging the protrusion 68 at a position of 71 μm or less in the longitudinal direction from the support 17. That is, in the optical waveguide 60 that includes the protrusions 68 intermittently arranged, the maximum value of the distance at which sticking does not occur without the protrusions 68 is 71 μm.

Figure 25:
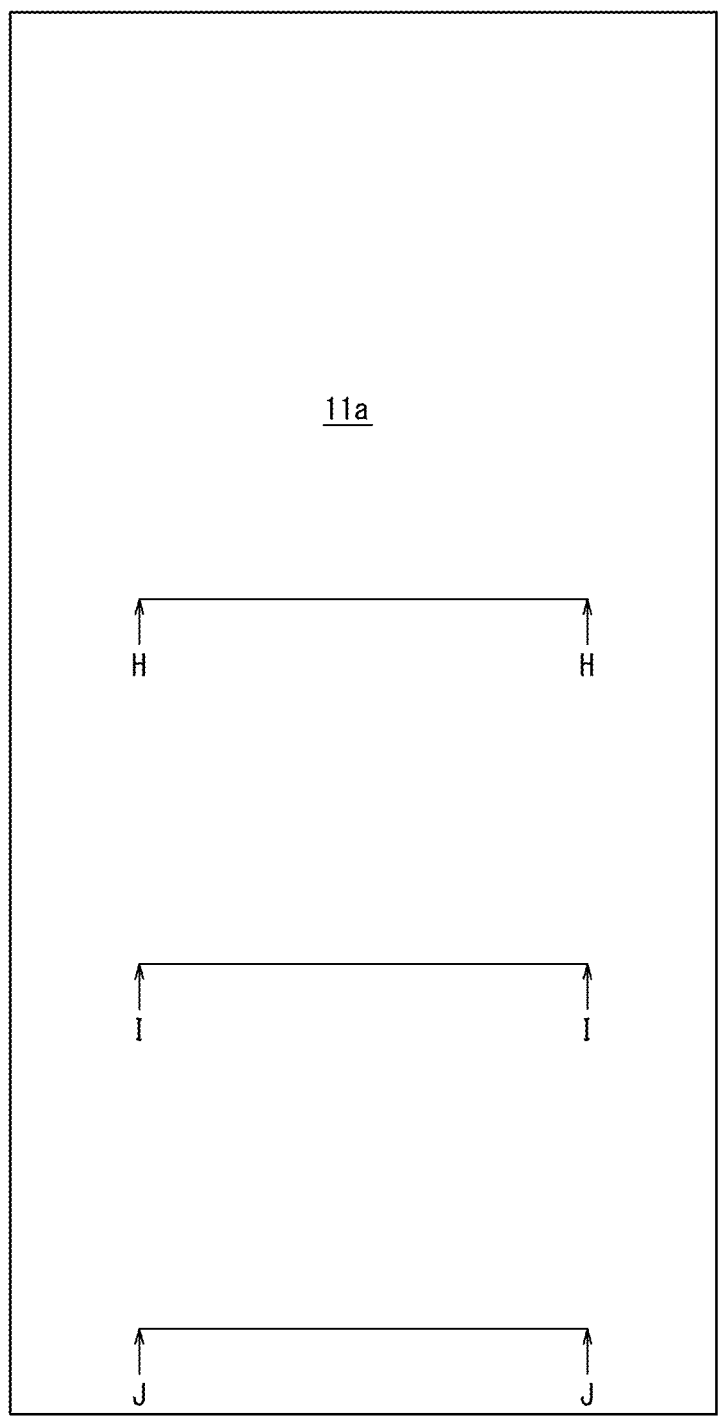
FIG. 25 is a plan view of a SOI substrate, for illustrating a method for manufacturing the optical waveguide according to the second embodiment of the present disclosure.
Figure 26:
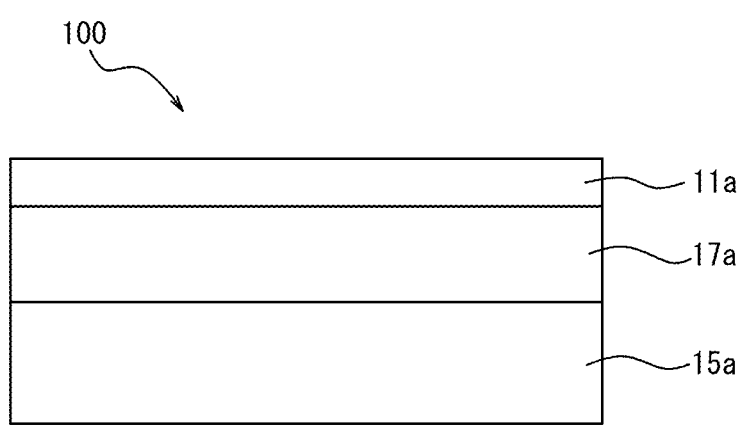
FIG. 26 is a cross-sectional end view of a SOI substrate taken from lines H-H, I-I, and J-J in FIG. 25.
Figure 27:
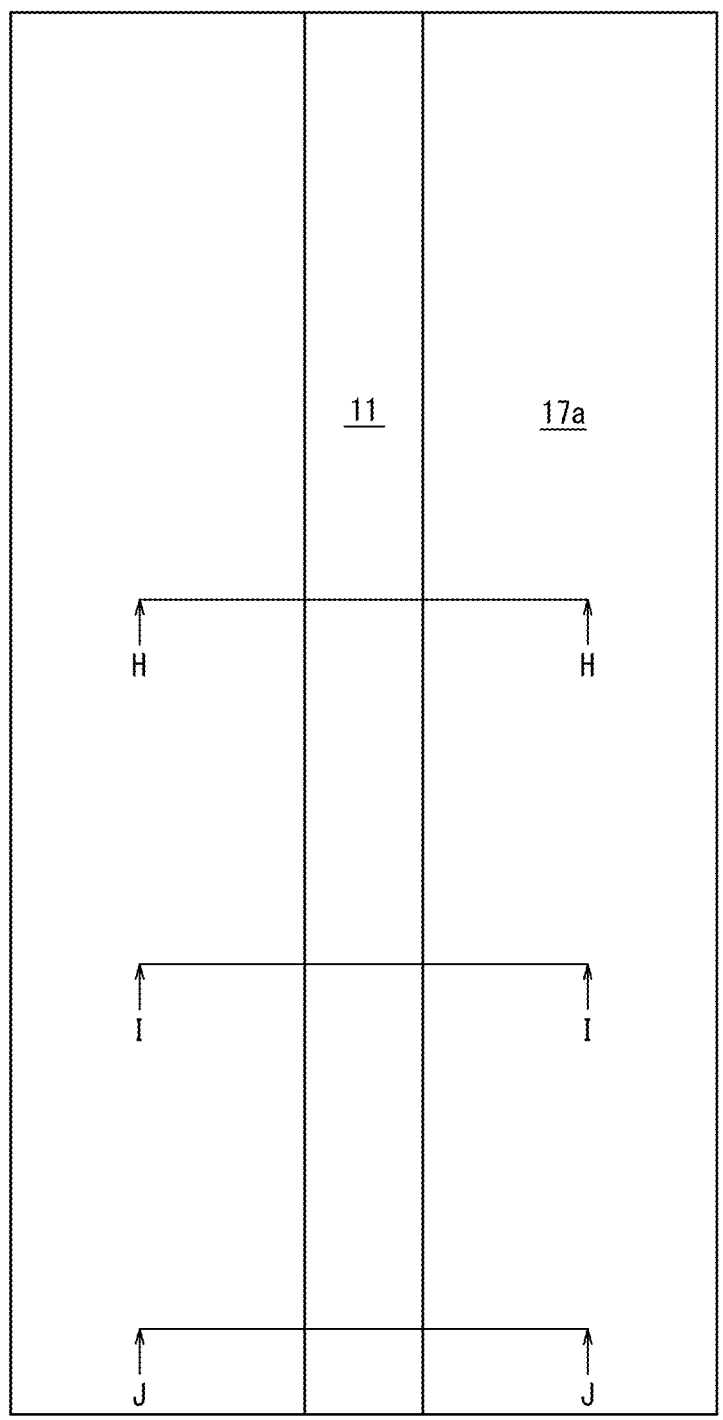
FIG. 27 is a plan view of an optical waveguide main portion, for illustrating the method for manufacturing the optical waveguide according to the second embodiment of the present disclosure.
Figure 28:
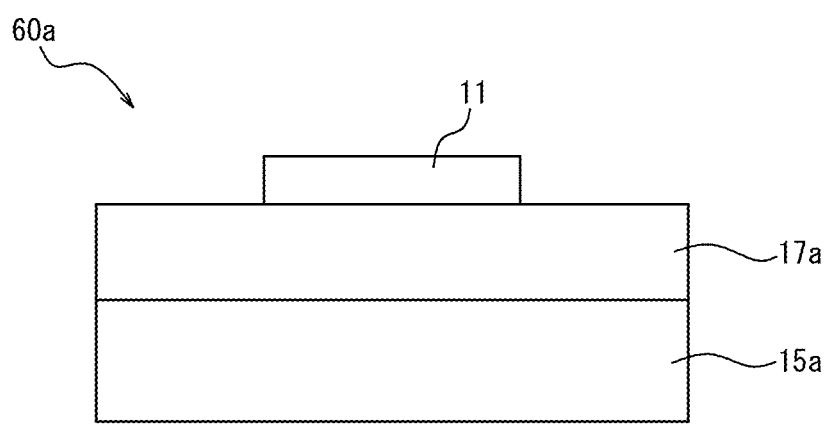
FIG. 28 is a cross-sectional end view of the optical waveguide main portion taken from lines H-H, I-I, and J-J in FIG. 27.
Figure 29:
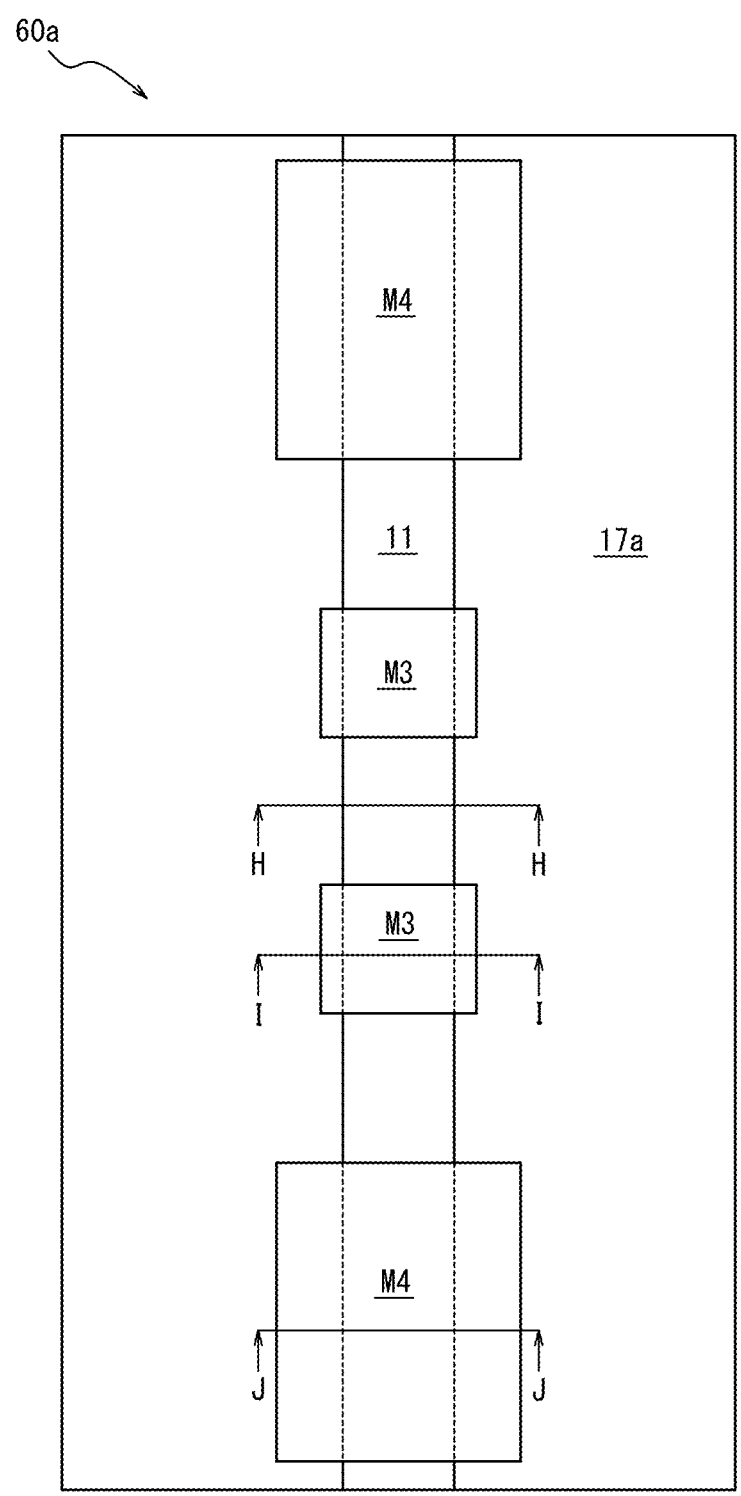
FIG. 29 is a plan view of the optical waveguide main portion partially covered with mask patterns, for illustrating the method for manufacturing the optical waveguide according to the second embodiment of the present disclosure.
Figure 30:
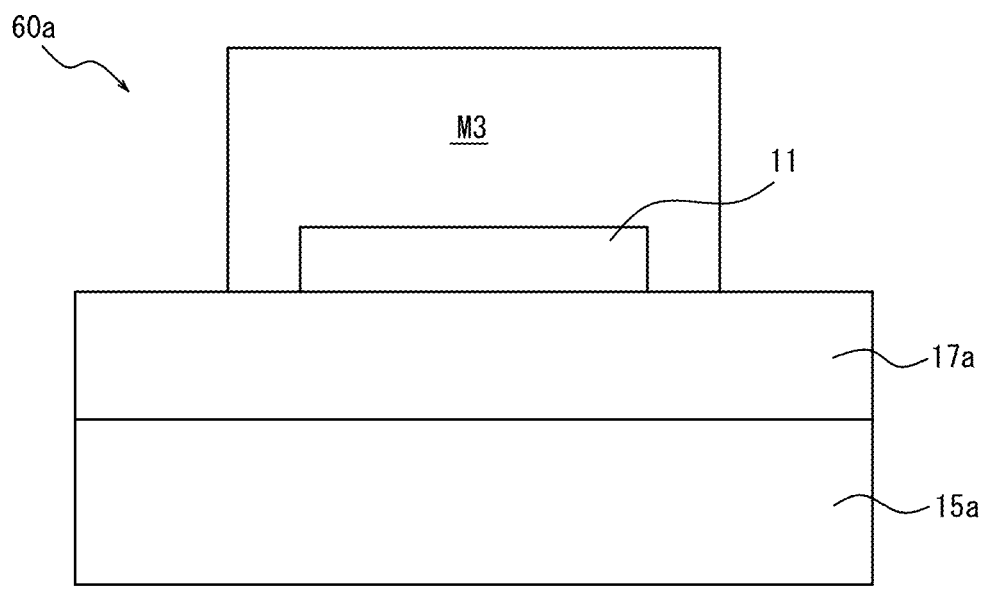
FIG. 30 is a cross-sectional end view of the optical waveguide main portion taken from line I-I in FIG. 29.
Figure 31:
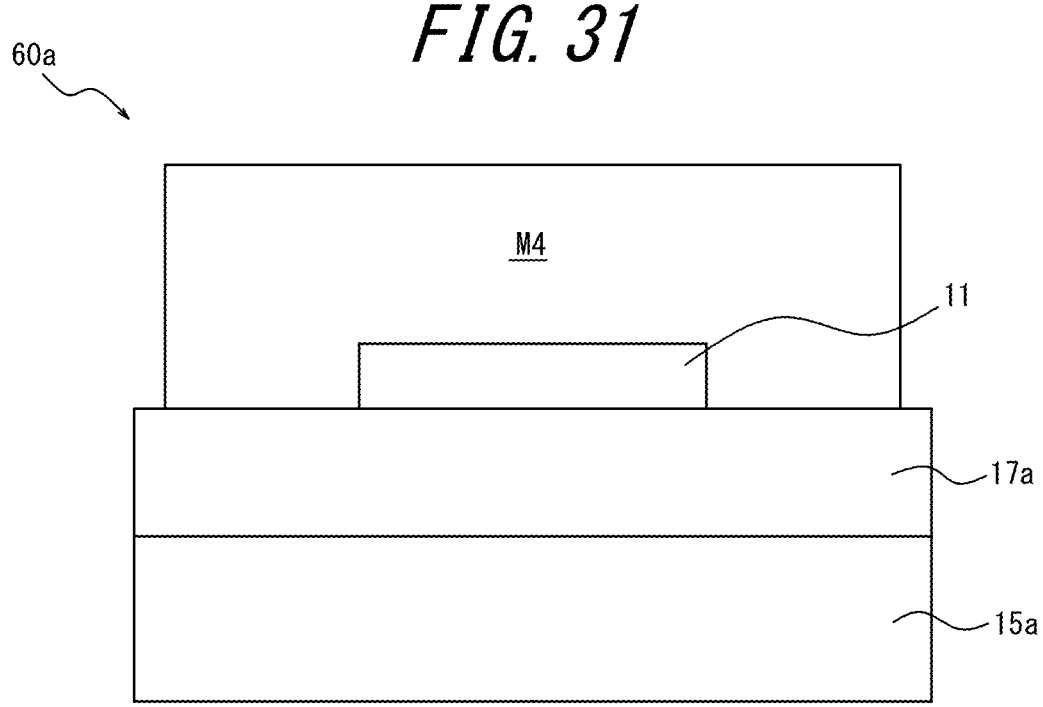
FIG. 31 is a cross-sectional end view of the optical waveguide main portion taken from line J-J in FIG. 29.
Figure 32:
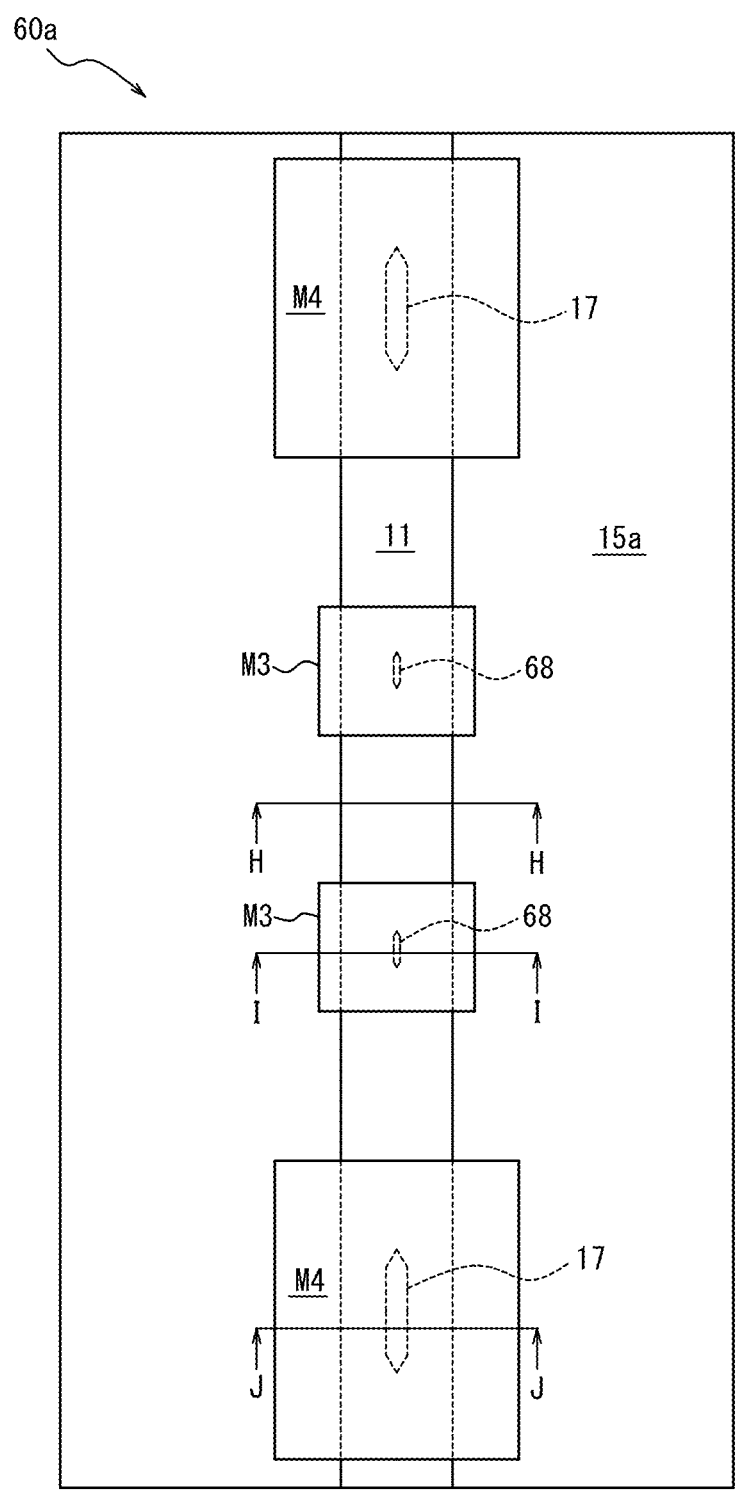
FIG. 32 is a plan view of the optical waveguide main portion in which a BOX layer is partially removed, for illustrating the method for manufacturing the optical waveguide according to the second embodiment of the present disclosure.
Figure 33:
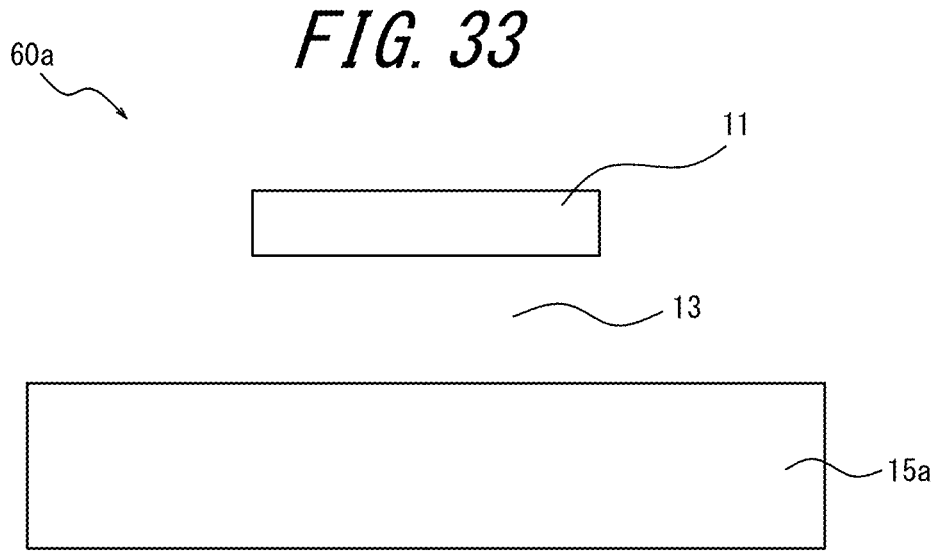
FIG. 33 is a cross-sectional end view of the optical waveguide main portion taken from line H-H in FIG. 32.
Figure 34:
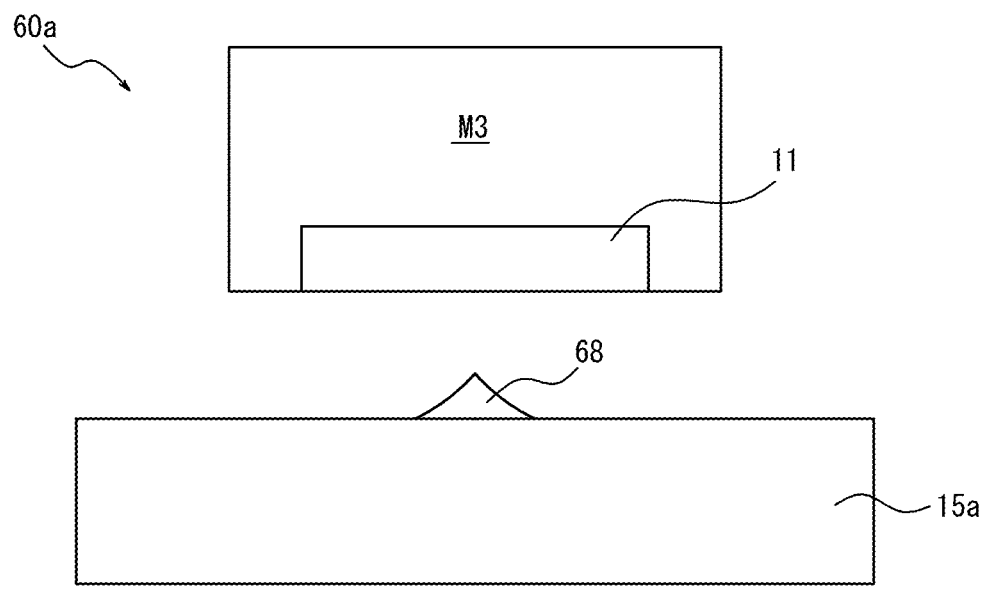
FIG. 34 is a cross-sectional end view of the optical waveguide main portion taken from line I-I line in FIG. 32.
Figure 35:
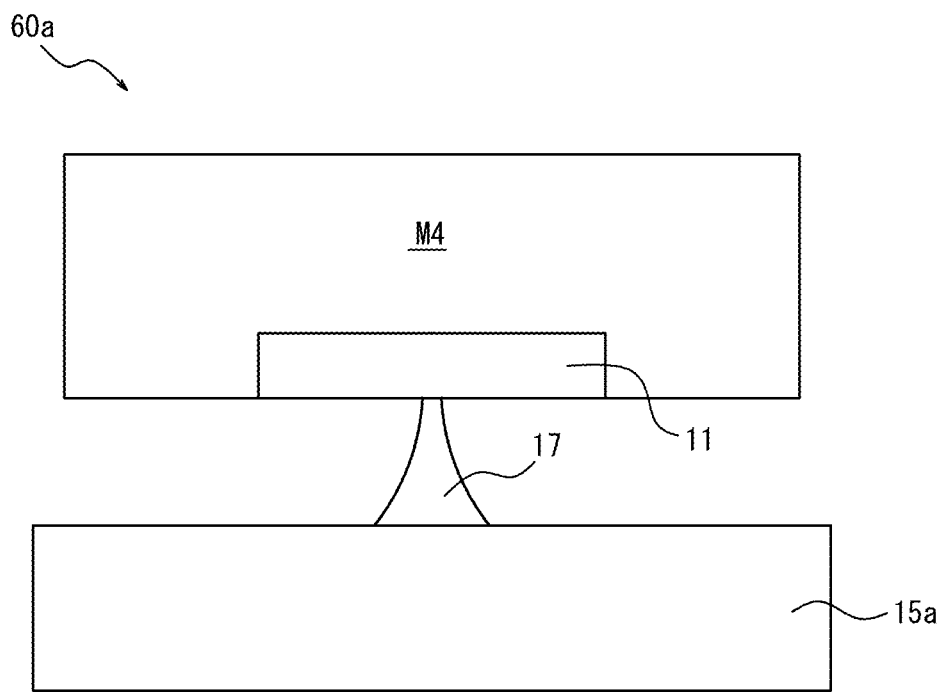
FIG. 35 is a cross-sectional end view of the optical waveguide main portion taken from line J-J line in FIG. 32.
Figure 36:
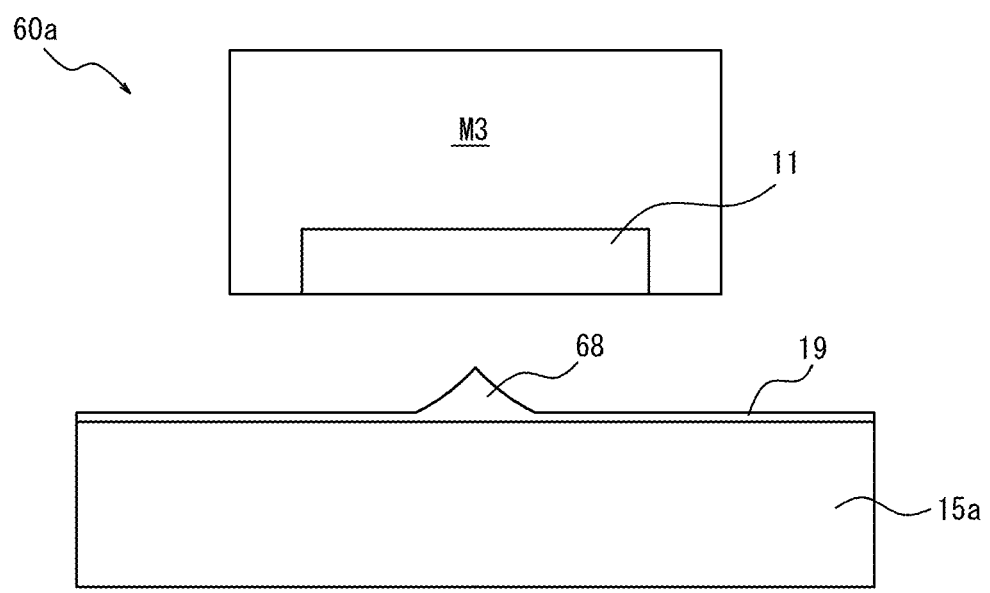
FIG. 36 is a cross-sectional end view of an optical waveguide main portion taken from the same position as line I-I in FIG. 32 according to a variation of the second embodiment of the present disclosure.

Next, a method for manufacturing the optical waveguide 60 according to the present embodiment will be described with reference to FIG. 25 to FIG. 36 using FIG. 20 to FIG. 24. FIG. 25 illustrates a manufacturing process plan view of the optical waveguide 60. FIG. 26 illustrates a manufacturing process end view of the optical waveguide 60 taken from lines H-H, I-I, and J-J in FIG. 25. FIG. 27 illustrates a manufacturing process plan view of the optical waveguide 60. FIG. 28 illustrates a manufacturing process end view of the optical waveguide 60 taken from lines H-H, I-I, and J-J in FIG. 27. FIG. 29 illustrates a manufacturing process plan view of the optical waveguide 60. FIG. 30 is a manufacturing process end view of the optical waveguide 60 taken from line I-I in FIG. 29. FIG. 31 illustrates a manufacturing process end view of the optical waveguide 60 taken from line J-J in FIG. 29. Note that the manufacturing process end view of the optical waveguide 60 taken from line H-H line in FIG. 29 does not include the mask pattern M3 and the mask pattern M4 and thus has the same configuration as the manufacturing process end view illustrated in FIG. 28. FIG. 32 illustrates a manufacturing process plan view of the optical waveguide 60. FIG. 33 illustrates a manufacturing process end view of the optical waveguide 60 taken from line H-H in FIG. 32. FIG. 34 illustrates a manufacturing process end view of the optical waveguide 60 taken from line I-I in FIG. 32. FIG. 35 illustrates a manufacturing process end view of the optical waveguide 60 taken from line J-J in FIG. 32. FIG. 36 illustrates a manufacturing process end view in which the optical waveguide main portion of a variation of the present embodiment is taken from the same position as the line I-I in the optical waveguide main portion 60a illustrated in FIG. 32.

First, a $SiO_2$ film is formed on one or both of a support substrate 15a that is made of silicon and eventually formed as the substrate 15, and an active substrate 11a that is made of silicon and eventually formed as the core layer 11. Next, the support substrate 15a and the active substrate 11a are stuck together with the $SiO_2$ film therebetween and subjected to heat treatment to be joined together. Then, the film thickness of the active substrate 11a is adjusted to a predetermined thickness by grinding, polishing, or the like. Thus, an SOI substrate 100 having a "silicon-insulating layer-silicon" structure that includes the support substrate 15a, a BOX layer 17a formed on the support substrate 15a, and the active substrate 11a formed on the BOX layer 17a is formed as illustrated in FIG. 25 and FIG. 26.

Next, lithography and etching are performed on the SOI substrate 100 to etch the active substrate 11a and form the core layer 11 that has a rectangular cross-section and extends in the longitudinal direction. Thus, the optical waveguide main portion 60a that includes a support substrate 15a having a plate-like shape, the BOX layer 17a having a plate-like shape and formed on the support substrate 15a, and the core layer 11 formed as a rectangular prism on a portion of the BOX layer 17a is formed as illustrated in FIG. 27 and FIG. 28.

Next, the mask patterns M3 and mask patterns M4 that cover portions of the core layer 11 and portions of the BOX layer 17a are intermittently formed in the longitudinal direction of the core layer 11 as illustrated in FIG. 29. The mask patterns M3 are arranged in a symmetrical manner with respect to the central position of the core layer 11 in the width direction as illustrated in FIG. 29 and FIG. 30. The mask patterns M4 are arranged in a symmetrical manner with respect to the center of the core layer 11 in the width direction and wider than the mask patterns M3 as illustrated in FIG. 29 and FIG. 31. The mask patterns M3 and the mask patterns M4 may be formed from photoresist or hard masks such as silicon nitride films. Also, the mask patterns M3 and the mask patterns M4 may be an integral mask layer (i.e., one mask layer) or individual mask layers.

Next, a portion of the BOX layer 17a of the optical waveguide main portion 60a is removed by performing wet etching or the like using the mask patterns M3 and the mask patterns M4 as masks. Thus, in the areas of the core layer 11 that do not have the mask patterns M3 or the mask patterns M4 in the longitudinal direction, the support 17 and the protrusion 68 are not formed and the gap 13 is formed as illustrated in FIG. 32 and FIG. 33. In each area of the core layer 11 that has the mask M3 in the longitudinal direction, the protrusion 68 is formed at the central position of the core layer 11 in the width direction as illustrated in FIG. 32 and FIG. 34. In each area of the core layer 11 that has the mask M4 in the longitudinal direction, the support 17 is formed at the central position of the core layer 11 in the width direction as illustrated in FIG. 32 and FIG. 35. Although a portion of the BOX layer 17a other than the portion forming the support 17 and the protrusion 18 is removed in FIG. 32 to FIG. 35, this portion of the BOX layer 17a does not need to be completely removed. As illustrated in a variation of the present embodiment referring to in FIG. 36, the thin film 19 covering the support substrate 15a may be formed from the remainder of the BOX layer 17a. At this time, the maximum height of the protrusion 68 corresponds to the height of the peak of the mountain-like shape of the protrusion 68 from a lowest position of the surface of the thin film 19 in the region immediately below the core layer 11.

Next, the mask patterns M3 and the mask patterns M4 are etched. Although the formation of the grating couplers is omitted in the present embodiment, when the grating couplers 118 and 119 as illustrated in FIG. 20 are formed, the grating couplers 118 and 119 may be formed simultaneously with, before, or after the formation of the core layer 11 illustrated in FIG. 27, followed by the formation of the mask patterns M3 and M4 illustrated in FIG. 29. The configuration illustrated in FIG. 20 is obtained by forming the grating coupler 118 in a slit-like shape at one end portion of the core layer 11 in the longitudinal direction and forming the grating coupler 119 having a slit-like shape at the other end portion of the core layer 11 in the longitudinal direction.

Then, the support substrate 15a is cut in a predetermined region to separate the optical waveguide main portion 60a. Thus, the optical waveguide 60 in which the protrusions 68 are intermittently provided in the longitudinal direction of the core layer 11 is produced (see FIG. 20 to FIG. 24).

As illustrated in FIG. 20, further, the optical concentration measuring apparatus 6 is produced by installing the light source 20 in such a manner as to be able to irradiate the infrared radiation IR into the grating coupler 118 of the optical waveguide 60 and by arranging the photodetector 40 in such a manner as to be able to receive the infrared radiation IR exit from the grating coupler 119 of the optical waveguide 60.

As described above, the optical waveguide 60 has a configuration in which the protrusions 68 are intermittently arranged in the longitudinal direction of the core layer 11. Thus, the optical waveguide 60 can suppress the occurrence of sticking of the core layer 11 and prevent deterioration of the detecting characteristics for detecting a substance to be measured MO caused by the protrusions 68.

According to the present embodiment, as described above, the optical waveguide 60 and the optical concentration measuring apparatus 6 that include the protrusions 68 which suppress the occurrence of sticking of the core layer 11 and prevent deterioration of the sensitivity of the sensor can be provided.

Further, the optical waveguide 60 according to the present embodiment can reduce the amount of the evanescent wave EW absorbed by the protrusions 68. Thus, the optical waveguide 60 according to the present embodiment can detect the substance to be measured MO with high sensitivity in a stable manner in various specification modes.

APPENDIX

[1] An optical waveguide used in an optical concentration measuring apparatus for measuring concentration of a target gas or a target liquid to be measured, the optical waveguide includes: a substrate; a core layer that can transmit light and extends along a longitudinal direction; a support that connects at least a portion of the substrate and a portion of the core layer together and supports the core layer with respect to the substrate; and protrusions that are intermittently arranged in the longitudinal direction in a space between the substrate and the core layer and protrude toward the core layer from the substrate.

[2] The optical waveguide according to [1], wherein the support is made of a material having a smaller refractive index than the core layer.

[3] The optical waveguide according to [1], wherein the protrusions are made the same material as the support.

[4] The optical waveguide according to [1], wherein each of the protrusions has a mountain-like shape.

[5] The optical waveguide according to [1], wherein each of the protrusions has a symmetrical shape in a width direction of the core layer.

[6] The optical waveguide according to [1], wherein each of the protrusions has an asymmetrical shape in a width direction of the core layer.

[7] The optical waveguide according to [1], wherein a maximum height of the protrusions is equal to or more than 1/20 of a gap between the core layer and the substrate.

[8] The optical waveguide according to [1],
wherein a maximum height of the protrusions is 100 nm or more.

[9] The optical waveguide according to [1],
wherein the core layer extending in the longitudinal direction includes a curved portion, and the protrusions are arranged immediately below the curved portion.

[10] The optical waveguide according to [1],
wherein there is an area that does not include the protrusion and the support around a given protrusion in the longitudinal direction, and a longitudinal length of the area is equal to or smaller than:

$$\frac{1}{2}\left(\frac{Eh^2t^3}{\alpha}\right)^{\frac{1}{4}},$$ [Formula 10]

where E is Young's modulus [N/m$^2$] of the core layer, h is a floating distance [m] between the core layer and substrate, t is a thickness [m] of core layer, and α is an experimental proportional parameter 45.2345×10$^{-6}$ [N/m].

[11] The optical waveguide according to [1],
wherein there is an area that does not include the protrusion and the support around a given protrusion in the longitudinal direction, and a longitudinal length of the area is 71 μm or less.

[12] The optical waveguide according to [1],
wherein maximum height positions of the protrusions in the width direction of the core layer are deviated from a central position of the core layer.

[13] The optical waveguide according to [1],
wherein at least a portion of the core layer is exposed or covered with a thin film.

[14] The optical waveguide according to [1],
wherein the light transmitted through the core layer is infrared radiation serving as an analogue signal.

[15] An optical concentration measuring apparatus comprising:
the optical waveguide according to [1];
a light source capable of irradiating light into the core layer; and
a detector capable of receiving light transmitted through the core layer.

[16] The optical concentration measuring apparatus according to [15],
wherein the light source is configured to irradiate infrared radiation having a wavelength, in vacuum, of 2 μm to 12 μm into the core layer.

The invention claimed is:

1. An optical waveguide used in an optical concentration measuring apparatus for measuring concentration of a target gas or a target liquid to be measured, the optical waveguide comprising:
a substrate;
a core layer that can transmit light and extends along a longitudinal direction;
a support that connects at least a portion of the substrate and a portion of the core layer and supports the core layer with respect to the substrate; and
protrusions that are intermittently arranged in the longitudinal direction in a space between the substrate and the core layer and protrude toward the core layer from the substrate.

2. The optical waveguide according to claim 1,
wherein the support is made of a material having a smaller refractive index than a refractive index of the core layer.

3. The optical waveguide according to claim 1,
wherein the protrusions are made of the same material as the support.

4. The optical waveguide according to claim 1,
wherein each of the protrusions has a mountain-like shape.

5. The optical waveguide according to claim 1,
wherein each of the protrusions has a symmetrical shape in a width direction of the core layer.

6. The optical waveguide according to claim 1,
wherein each of the protrusions has an asymmetrical shape in a width direction of the core layer.

7. The optical waveguide according to claim 1,
wherein a maximum height of the protrusions is equal to or more than 1/20 of a gap between the core layer and the substrate.

8. The optical waveguide according to claim 1,
wherein a maximum height of the protrusions is 100 nm or more.

9. The optical waveguide according to claim 1,
wherein the core layer extending in the longitudinal direction includes a curved portion, and the protrusions are arranged immediately below the curved portion.

10. The optical waveguide according to claim 1,
wherein there is an area that does not include the protrusion and the support around a given protrusion in the longitudinal direction, and a longitudinal length of the area is equal to or smaller than:

$$\frac{1}{2}\left(\frac{Eh^2t^3}{\alpha}\right)^{\frac{1}{4}},$$ [Formula 1]

where E is Young's modulus [N/m$^2$] of the core layer, h is a floating distance [m] between the core layer and the substrate, t is a thickness [m] of the core layer, and a is an experimental proportional parameter 45.2345×10$^{-6}$ [N/m].

11. The optical waveguide according to claim 1,
wherein there is an area that does not include the protrusion and the support around a given protrusion in the longitudinal direction, and a longitudinal length of the area is 71 μm or less.

12. The optical waveguide according to claim 11,
wherein maximum height positions of the protrusions in the width direction of the core layer are deviated from a central position of the core layer.

13. The optical waveguide according to claim 11,
wherein at least a portion of the core layer is exposed or covered with a thin film.

14. The optical waveguide according to claim 1,
wherein the light transmitted through the core layer is infrared radiation serving as an analogue signal.

15. An optical concentration measuring apparatus comprising:
the optical waveguide according to claim 1;
a light source capable of irradiating light into the core layer; and
a detector capable of receiving light transmitted through the core layer.

16. The optical concentration measuring apparatus according to claim 15,
   wherein the light source is configured to irradiate infrared radiation having a wavelength, in vacuum, of 2 μm to 12 μm into the core layer.

* * * * *